US009280719B2

(12) United States Patent
Criminisi et al.

(10) Patent No.: US 9,280,719 B2
(45) Date of Patent: Mar. 8, 2016

(54) FOREGROUND AND BACKGROUND IMAGE SEGMENTATION

(71) Applicant: Microsoft Corporation, Redmond, WA (US)

(72) Inventors: Antonio Criminisi, Cambridge (GB); Jamie Daniel Joseph Shotton, Cambridge (GB); Andrew Fitzgibbon, Cambridge (GB); Toby Sharp, Cambridge (GB); Matthew Darius Cook, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/148,404

(22) Filed: Jan. 6, 2014

(65) Prior Publication Data
US 2014/0126821 A1 May 8, 2014

Related U.S. Application Data

(62) Division of application No. 12/790,026, filed on May 28, 2010, now Pat. No. 8,625,897.

(51) Int. Cl.
*G06K 9/34* (2006.01)
*G06K 9/38* (2006.01)
(Continued)

(52) U.S. Cl.
CPC .. *G06K 9/34* (2013.01); *G06K 9/38* (2013.01); *G06T 7/0081* (2013.01); *G06T 7/0095* (2013.01); *G06T 2207/10016* (2013.01); *G06T 2207/20048* (2013.01); *G06T 2207/20141* (2013.01); *G06T 2207/20144* (2013.01);
(Continued)

(58) Field of Classification Search
CPC ............ G06T 7/0081; G06T 2207/20144; G06T 2207/10024; G06T 2207/20101; G06T 2207/10028; G06T 2207/10072; G06T 2207/10081; G06T 2207/20041; G06T 2207/20141; G06T 2207/20156; G06T 2207/30061
See application file for complete search history.

(56) References Cited

U.S. PATENT DOCUMENTS 5,633,948 A   5/1997 Kegelmeyer, Jr.
6,766,037 B1 * 7/2004 Le et al. .......................... 382/107
6,937,744 B1   8/2005 Toyama
(Continued)

OTHER PUBLICATIONS

U.S. Appl. No. 12/454,628, filed May 20, 2009, Andrew Fitzgibbon and Jamie Shotten, "Human Body Post Estimation".
(Continued)

*Primary Examiner* — Jingge Wu
(74) *Attorney, Agent, or Firm* — Jim Ross; Sonia Cooper; Micky Minhas

(57) ABSTRACT

Foreground and background image segmentation is described. In an example, a seed region is selected in a foreground portion of an image, and a geodesic distance is calculated from each image element to the seed region. A subset of the image elements having a geodesic distance less than a threshold is determined, and this subset of image elements are labeled as foreground. In another example, an image element from an image showing at least a user, a foreground object in proximity to the user, and a background is applied to trained decision trees to obtain probabilities of the image element representing one of these items, and a corresponding classification assigned to the image element. This is repeated for each image element. Image elements classified as belonging to the user are labeled as foreground, and image elements classified as foreground objects or background are labeled as background.

20 Claims, 17 Drawing Sheets

(51) Int. Cl.
  *G06T 7/00* (2006.01)
  *H04N 13/02* (2006.01)

(52) U.S. Cl.
  CPC .............. *G06T2207/20156* (2013.01); *G06T 2207/30196* (2013.01); *H04N 13/0239* (2013.01)

(56) References Cited

U.S. PATENT DOCUMENTS

| | | | |
|---|---|---|---|
| 7,512,250 B2 | 3/2009 | Lim et al. | |
| 7,676,081 B2 | 3/2010 | Blake et al. | |
| 2003/0204384 A1 | 10/2003 | Owechko et al. | |
| 2004/0001612 A1 | 1/2004 | Gutta et al. | |
| 2005/0201591 A1* | 9/2005 | Kiselewich | 382/104 |
| 2006/0167655 A1 | 7/2006 | Barrow et al. | |
| 2007/0055153 A1* | 3/2007 | Simopoulos et al. | 600/437 |
| 2007/0133880 A1 | 6/2007 | Sun et al. | |
| 2007/0269108 A1 | 11/2007 | Steinberg et al. | |
| 2008/0103886 A1* | 5/2008 | Li et al. | 705/14 |
| 2008/0107338 A1* | 5/2008 | Furmaniak et al. | 382/176 |
| 2008/0143718 A1* | 6/2008 | Ray et al. | 345/424 |
| 2008/0187219 A1* | 8/2008 | Chen et al. | 382/173 |
| 2008/0219554 A1 | 9/2008 | Dorai et al. | |
| 2009/0129673 A1* | 5/2009 | Simon et al. | 382/173 |
| 2009/0290795 A1* | 11/2009 | Criminisi et al. | 382/173 |
| 2010/0070339 A1* | 3/2010 | Bae et al. | 705/10 |
| 2010/0278384 A1* | 11/2010 | Shotton et al. | 382/103 |
| 2010/0296718 A1* | 11/2010 | Ostrovsky-Berman et al. | 382/133 |
| 2010/0303322 A1* | 12/2010 | Whelan et al. | 382/131 |
| 2011/0274352 A1* | 11/2011 | Blake et al. | 382/173 |

OTHER PUBLICATIONS

U.S. Appl. No. 12/575,363, filed Oct. 7, 2009, Craig Peeper, Johnny Lee, Tommy Leyvand, and Szymon Stachniak, "Systems and Methods for Removing a Background of an Image".

U.S. Appl. No. 61/174,878, filed Mar. 1, 2009, Andrew Fitzgibbon and Jamie Shotten, "Human Body Post Estimation".

Criminisi, et al., "GeoS: Geodesic Image Segmentation", Springer-Verlag Berlin, Lecture Notes in Computer Science, vol. 5302, Proceedings of the European Conference on Computer Vision: Part I (ECCV), Marseille, FR, 2008, pp. 99-112.

Goldlucke, et al., "Joint 30-Reconstruction and Background Separation in Multiple Views using Graph Cuts", retrieved on Mar. 31, 2010 at <<http://graphics.tu-bs.de/people/magnor/publications/cvpr03.pdf>>, IEEE Computer Society, Conference on Computer Vision and Pattern Recognition (CVPR), Madison, WI, vol. 1, 2003, pp. 683-688.

Tsai, et al., "Background Removal of Multiview Images by Learning Shape Priors", retrieved on Mar. 31, 2010 at <<http://www.znu.ac.ir/data/members/fazli_saeid/DIP/Paper/ISSUE10/04303155.pdf>>, IEEE Transactions on Image Processing, vol. 16, No. 10, Oct. 2007, pp. 2607-2616.

Tzovaras, et al., "3-D Camera Motion Estimation and Foreground I Background Separation for Stereoscopic Image Sequences", retrieved on Mar. 31, 2010 at <<http://www.iti.gr/files/3-d%20camer%20motion%20estimation%20and%20foreground.pdf>>, Optical Engineering, vol. 36, No. 2, 1997, pp. 574-579.

* cited by examiner

FOREGROUND AND BACKGROUND IMAGE SEGMENTATION

RELATED APPLICATION

This application is a divisional of, and claims priority to, U.S. patent application Ser. No. 12/790,026, filed May 28, 2010, and entitled "FOREGROUND AND BACKGROUND IMAGE SEGMENTATION" having an issue date of Jan. 7, 2014 and a U.S. Pat. No. 8,625,897. The disclosure of the above-identified application is hereby incorporated by reference in its entirety as if set forth herein in full.

BACKGROUND

In many computing applications, a user manipulates or controls an application or game using specific user input hardware devices. Examples, of such hardware devices include game controllers, remote controls, keyboards and mice. Such controls can be difficult to learn and hence create a barrier to adoption of the application or game. An example of this is a computer game which is controlled by a game controller. To play the game successfully, the user first has to learn how the manipulation of the game controller relates to the control of the game (e.g. which button controls which aspect of an on-screen character). This initial learning period may be sufficient to dissuade a user from playing the game. Furthermore, the movements used to operate an input device generally do not correlate closely to the resulting action in the game or application. For example, the movement of a joystick or pressing of a button does not correspond closely to the movement of a bat or racket in a game environment.

Motion-based controller devices can be used to more accurately reflect the movement of the user in the application or game. However, hardware input devices are still operated by the user in such systems (e.g. held, pointed or swung). Camera-based user input does not use input devices. Rather a camera captures images of the user and interprets these as input gestures or movements. However, camera-based user input produces a large amount of image data, which needs to be processed in real-time to accurately control a game or application. For example, the captured camera images should be segmented in real-time so that a user in the foreground of camera image is separated from any surrounding background, enabling the user's gestures and pose to be analyzed.

The embodiments described below are not limited to implementations which solve any or all of the disadvantages of known camera-based user input techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Foreground and background image segmentation is described. In an example, a seed region is selected in a foreground portion of an image, and a geodesic distance is calculated from each image element to the seed region. A subset of the image elements having a geodesic distance less than a threshold is determined, and this subset of image elements are labeled as foreground. In another example, an image element from an image showing at least a user, a foreground object in proximity to the user, and a background is applied to trained decision trees to obtain probabilities of the image element representing one of these items, and a corresponding classification assigned to the image element. This is repeated for each image element. Image elements classified as belonging to the user are labeled as foreground, and image elements classified as foreground objects or background are labeled as background.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer games system, the system described is provided as an example and not a limitation. As those skilled in the art will appreciate, the present examples are suitable for application in a variety of different types of computing and image processing systems.

Note that the term "image element" is used hereinafter to refer to a pixel, group of pixels, voxel or other higher level component of an image.

Figure 1:
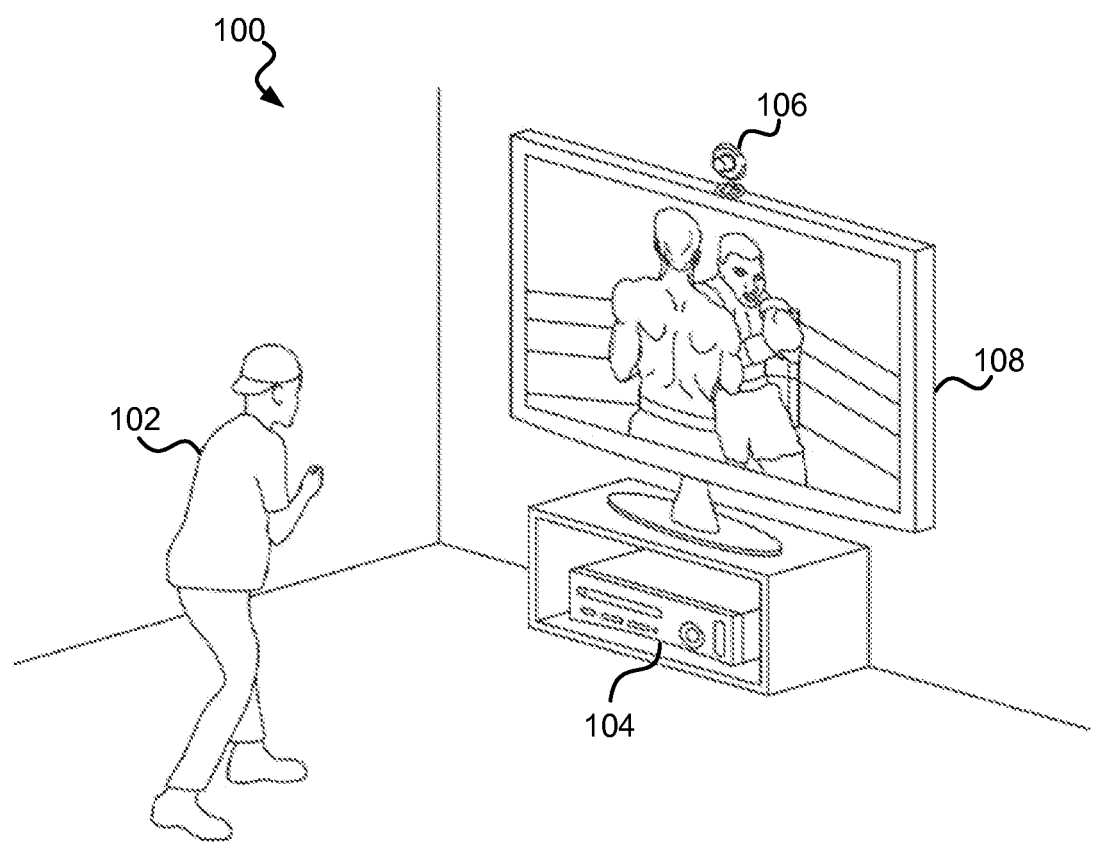
FIG. 1 illustrates an example camera-based control system for controlling a computer game.

Reference is first made to FIG. 1, which illustrates an example camera-based control system 100 for controlling a computer game. FIG. 1 shows a user 102 playing, in this illustrative example, a boxing game. In some examples, camera-based control system 100 can be used to, among other things, determine body pose, bind, recognize, analyze, track, associate to a human target, provide feedback, interpret gestures, and/or adapt to aspects of a human target such as the user 102.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or non-gaming applications. The structure of the computing device 104 is discussed hereinafter with reference to FIG. 17.

The camera-based control system 100 further comprises a capture device 106. The capture device 106 can be, for example, an image sensor or detector that can be used to visually monitor one or more users (such user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The computing device can be a television, a monitor, a high-definition television (HDTV), or the like that can provide game or application visuals (and optionally audio) to the user 102.

In operation, the user 102 can be tracked using the capture device 106 such that the position, movements and size of user 102 can be interpreted by the computing device 104 (and/or the capture device 106) as controls that can be used to affect the application being executed by computing device 104. As a result, the user 102 can move his or her body to control an executed game or application.

In the illustrative example of FIG. 1, the application executing on the computing device 104 is a boxing game that the user 102 is playing. In this example, the computing device 104 controls the display device 108 to provide a visual representation of a boxing opponent to the user 102. The computing device 104 also controls the display device 108 to provide a visual representation of a user avatar that the user 102 can control with his or her movements. For example, the user 102 can throw a punch in physical space to cause the user avatar to throw a punch in game space. Thus, according to this example, the computing device 104 and the capture device 106 of the camera-based control system 100 can be used to recognize and analyze the punch of the user 102 in physical space such that the punch may be interpreted as a game control of the user avatar in game space.

Furthermore, some movements can be interpreted as controls that correspond to actions other than controlling the avatar. For example, the user can use movements to enter, exit, turn system on or off, pause, save a game, select a level, profile or menu, view high scores, communicate with a friend, etc. Additionally, movement of the user 102 can be used and analyzed in any suitable manner to interact with applications other than games, for example to enter text, select icons or menu items, control media playback, browse websites or operate any other controllable aspect of an operating system or application.

Figure 2:
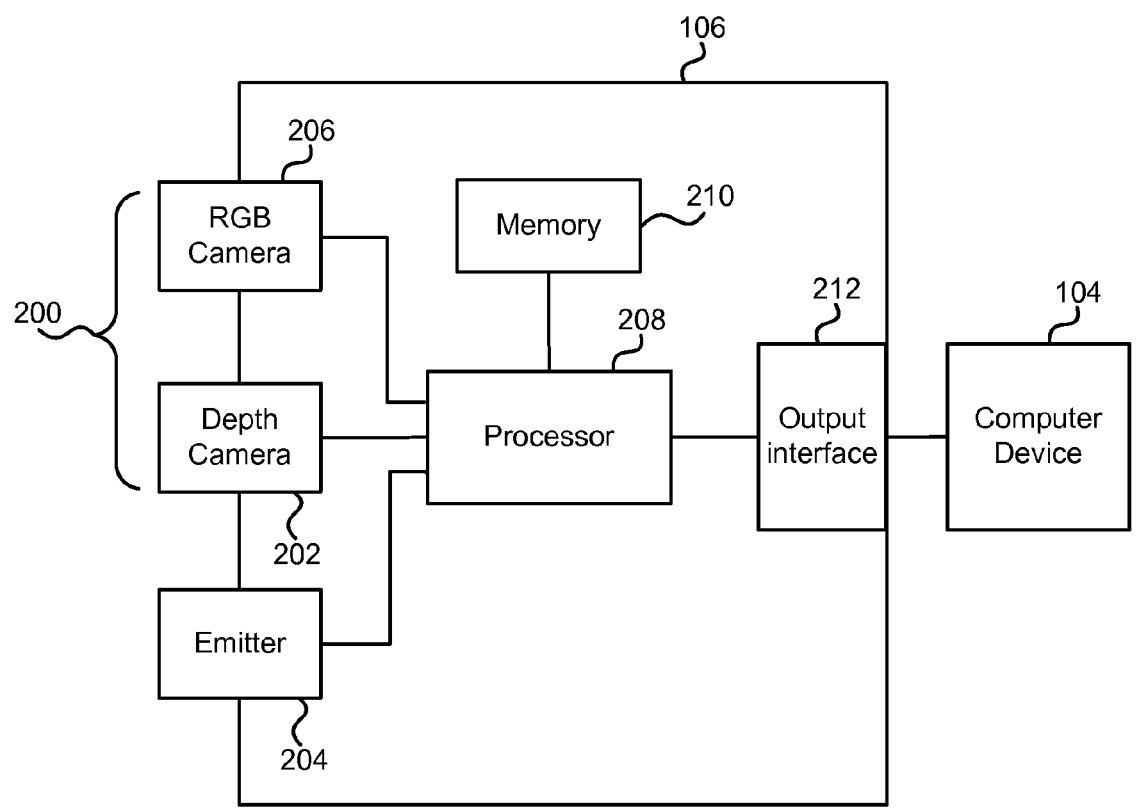
FIG. 2 illustrates a schematic diagram of an image capture device.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a location on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a location on the targets or objects. In a further example, time-of-flight analysis can be used to indirectly determine a physical distance from the capture device 106 to a location on the targets or objects by analyzing the intensity of the reflected beam of light over time via various techniques including, for example, shuttered light pulse imaging.

In another example, the capture device 106 can use structured light to capture depth information. In such a technique, patterned light (e.g., light displayed as a known pattern such as grid pattern or a stripe pattern) can be projected onto the scene using the emitter 204. Upon striking the surface of one or more targets or objects in the scene, the pattern becomes deformed. Such a deformation of the pattern can be captured by the depth camera 202 and then be analyzed to determine a physical distance from the capture device 106 to a location on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition to the depth camera 202, the capture device 106 can comprise a regular video camera, which is referred to as an RGB camera 206. The RGB camera 206 is arranged to capture sequences of images of the scene at visible light frequencies, and can hence provide images that can be used to augment the depth images. In alternative examples, the RGB camera 206 can be used instead of the depth camera 202.

The capture device 106 shown in FIG. 2 further comprises at least one processor 208, which is in communication with the imaging sensor 200 (i.e. depth camera 202 and RGB camera 206 in the example of FIG. 2) and the emitter 204. The processor 208 can be a general purpose microprocessor, or a specialized signal/image processor. The processor 208 is arranged to execute instructions to control the imaging sensor 200 and emitter 204 to capture depth images and/or RGB images. The processor 208 can also optionally be arranged to perform processing on these images, as outlined in more detail hereinafter.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire, Ethernet or similar) and/or a wireless connection (such as WiFi, Bluetooth or similar). In other examples, the output interface 212 can interface with one or more communication networks (such as the internet) and provide data to the computing device 104 via these networks.

Figure 3:
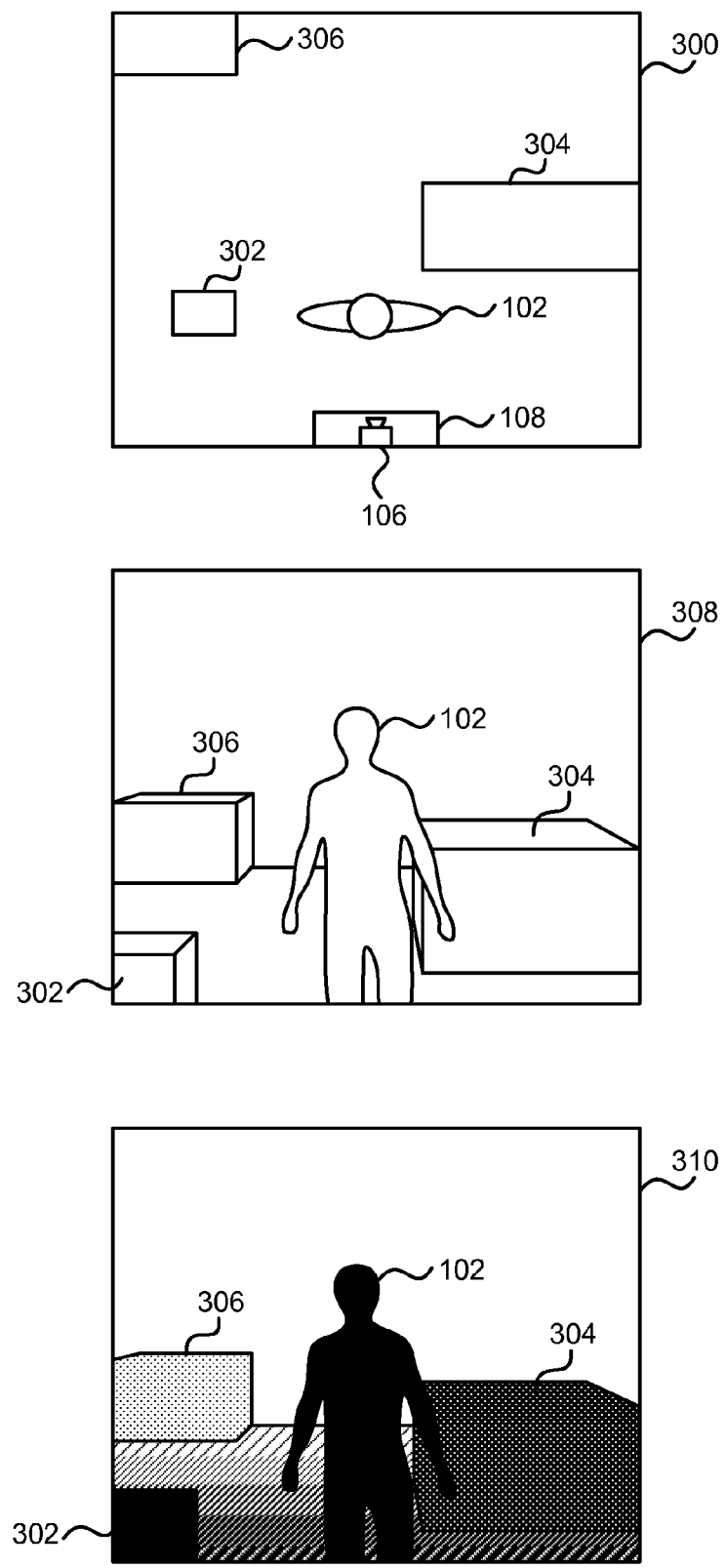
FIG. 3 illustrates an example scene as captured by a depth camera.

Reference is now made to FIG. 3, which illustrates an example scene as captured by a depth camera such as that shown in FIG. 2. A first view 300 shows the scene from above, and includes the user 102 stood in front of the capture device 106 and the display device 108. The user 102 is in a room having a floor, walls and a ceiling, and the room also contains a number of objects. A first object 302 is located at approximately the same distance from the capture device 106 as the user 102, and is in proximity to the user 102, but not in contact with the user 102. A second object 304 is located behind the user 102, such that the user 102 and the second object 304 overlap from the viewpoint of the capture device 104. The second object 304 is, however, a further distance away from the capture device 104 than the user 102. A third object 306 is located at the back of the room, and does not overlap with the user.

The first, second, and third objects can be, for example, furniture such as tables, chairs, shelves, sofas, couches, and the like. The objects can also be animate objects such as other persons or pets.

A second view 308 shows the scene from the point of view of the capture device 106. The second view 308 shows: the first object 302 to the left of, but not overlapping with, the user 102; the second object 304 overlapping an arm of the user 102; and the third object not overlapping with, the user. The second view 308 represents an image of the form taken by the RGB camera 206 in the capture device 106. Such an image can show information such as the color, texture or brightness of the objects in the scene. However, the information on the relative distances of the object in such an image is limited. Some distance information may be discernible through perspective, but this can be difficult to analyze using a computer. In other words, it is difficult for a computer to determine the relative depths of the objects from an image such as that shown in the second view 308.

On the other hand, a depth image, such as that captured by the depth camera 202, conveys useful depth information. An example depth image 310 is shown in the third view of the scene. In a depth image, each image element has an associated value that represents the measured distance between the capture device 106 and an object located at that image element. The associated values can be represented visually as intensity values in an image. For example, image elements representing objects close to the capture device 106 (i.e. a small distance) can be represented as having low intensity (i.e. dark/black) and image elements representing objects far away to the capture device 106 (i.e. a large distance) can be represented as having high intensity (i.e. light/white). Image elements between these two extreme distances can be represented by a corresponding shade of gray.

As shown in the depth image 310, the user 102 and the first object 302 are both approximately the same distance from the capture device 106, and are close to the capture device 106, and hence have a similar intensity value (black in this example). The second object 304 has a lighter intensity value than the user 102, due to being a greater distance from the capture device 106. The third object has a lighter intensity value still, due to being a yet further away from the capture device 106. The floor of the room has a graduated intensity value in the depth image 310, getting lighter as it stretches away from the capture device 106. The far wall of the room is shown in white, indicating it is the furthest distance shown in FIG. 3 from the capture device 106.

Clearly, the example shown in FIG. 3 is merely illustrative and for the purposes of explanation only. A real-life depth image comprises many more shades of intensity (even within one object), need not precisely extend between the intensity extremes of black for the user and white for the far wall, and does not show edges around objects.

Depth images are useful in the context of camera-based control systems such as that shown in FIG. 1 because they enable 3-D models of the user to be created, which reflect the user's movements in three dimensions. This enables the user to control the computing device using more realistic and accurate movements (as opposed to those simply seen face-on by a regular camera).

However, to generate a 3-D model of the user, the depth information about the user is first isolated from the rest of the image. In other words, the foreground information (i.e. the user) is segmented from the background information (i.e. the objects and the rest of the room). Once the user has been segmented from the rest of the image, then the position and movements of the user can be analyzed and used to control the game or application.

One technique for segmenting the user 102 from the rest of the image is to use a threshold filter. To do this, a portion of the user in the image is identified (for example using motion detection techniques described below) and the depth value for that portion is read. Then, all image elements in the image having a depth value within a predetermined threshold (which could be any value greater than or equal to zero) are selected as the foreground image elements, and the remaining image elements are selected as the background image elements.

For example, with reference to the depth image 310 of FIG. 3, if all the image elements having a depth value corresponding to "black" are selected (i.e. a narrow threshold) then the user 102 can be successfully segmented from the second object 304 and third object 306, as they are at a different depth and hence do not fall within the threshold filter. In other words, the image elements representing the second object 304 and third object 306 are not black. However, such a technique does not segment the first object 302, because it is at the same depth as the user 102 (i.e. is also black).

Therefore, a threshold filter technique suffers from the problem that when segmenting the user from the rest of the image, any objects that are at a depth within the predetermined threshold are not segmented. In addition, if the size of the predetermined threshold is too wide for the image in question, then additional objects are not segmented (e.g. the second object 304 and a lower portion of the floor could be included in the foreground if the threshold was "black and dark grey" in FIG. 3). Similarly, if the predetermined threshold is too narrow for the image in question, then portions of the user 102 could be segmented from the foreground in error, ultimately affecting the accuracy of the movement based control.

Another technique for segmenting the user 102 from the rest of the image is to use a "flood fill" technique. With this technique a portion of the user in the depth image is selected, and then all image elements that are in contact with the selected portion and are within a predefined threshold of the depth value are selected. This includes image elements that are in contact with the selected portion via one or more other image elements that are within the predefined threshold of the depth value. In other words, the selection spreads from the selected portion across the image until image elements are reached that have a depth value outside the predefined threshold.

For example, referring to the depth image 310 in FIG. 3, if an image element within the user 102 is selected, and the predefined threshold is set to encompass "black" only, then the segmentation selects all of the user's image elements, and stops at the edges of the user 102. Therefore, the flood fill technique avoids including objects having the same depth value as the user (such as the first object 302) in the foreground. In this respect, the flood fill technique therefore improves upon the threshold filter.

However, the flood fill technique has problems when used with real-life depth images. Firstly, setting the predefined threshold accurately is difficult. If the predefined threshold is too large, then the flood fill will "bleed" from the user into other objects in contact with the user (in the image) that are at depths within the predefined threshold. For example, if the predefined threshold were such that it included the depth of the second object 304, then the flood fill would bleed into the second object 304, and this would be included in the foreground. In addition, because the flood fill spreads until image elements outside the predefined threshold are reached, this results in the whole of the second object 304 being included in the foreground. This clearly makes analyzing the user's pose and movement difficult.

If the predefined threshold is too small, then regions of the user can become disconnected during the segmentation. For example, if the flood fill starts at the head of the user 102, but the predefined threshold is so narrow that image elements representing the neck of the user are not included (due to being a small distance further away from the capture device than the head) then the flood fill stops at the neck, leaving only the head segmented, and not the rest of the body. A similar situation can occur with a bent or outstretched arm or leg, meaning that some body parts are not included in the foreground, making movement analysis difficult.

Even if the predefined threshold is set at an appropriate value, then the flood fill technique can still result in portions of the user's body not being included in the foreground segmentation. For example, if a portion of the user's body in the depth image passes behind an object such that some of the user's body is shown one side of the object, and the remainder of the user's body is shown on the other side of the object, then the flood fill stops when it reaches the object. The flood fill does not progress any further to find the remainder of the user on the other side of the obstructing object. For example, if the user is holding an object in his hand, then in certain poses the object can lie over the user's arm in the image, dividing the arm in two. The flood fill does not pass the object, resulting in a part of the arm not being included in the foreground.

Figure 4:
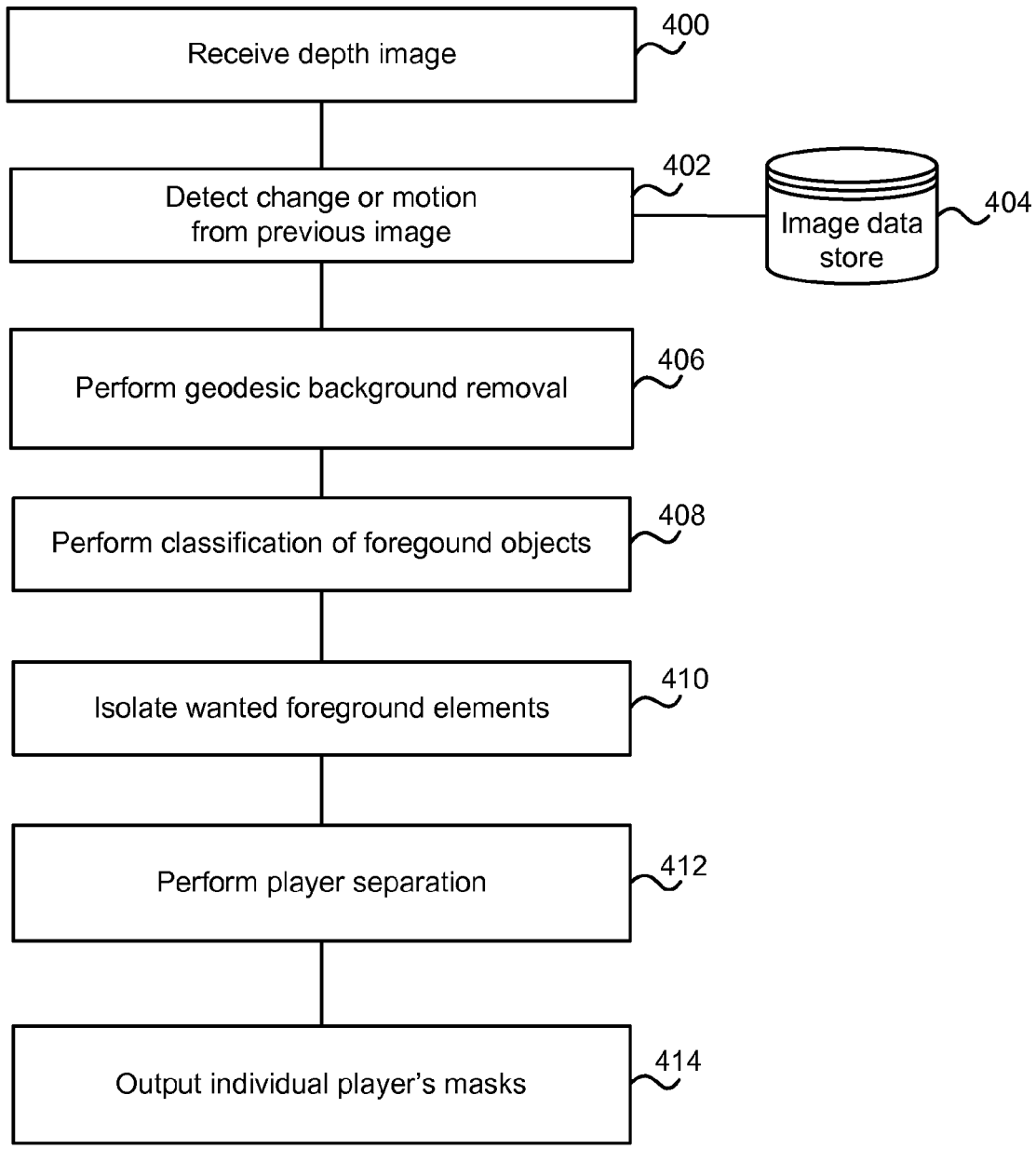
FIG. 4 illustrates a flowchart of a process for segmenting a depth camera image.

Reference is now made to FIG. 4, which illustrates a flowchart of a further process for segmenting a foreground portion from a background portion of a depth image. The process in FIG. 4 has several stages, each of which progressively improves the accuracy of the foreground segmentation, whilst maintaining computational efficiency.

The process of FIG. 4 can be performed at one or more processors of the computing device 104 (see FIG. 17 hereinafter), or at the at least one processor 208 of the capture device 106, or any combination thereof. For example, some stages of the process can be performed at the capture device 106, and others at the computing device 104.

Firstly, the depth image (such as depth image 310 shown in FIG. 3) is received 400 at a processor (be it at the capture device 106 or the computing device 104). For example, the depth image can be captured by the depth camera 202, and then provided to the computing device 104 via the output interface 212. The received depth image is then compared 402 to a previously received depth image, which is stored at an image data store on a storage device 404. The comparison between the received depth image and the previously received depth image detects any changes between the depth images. The detected change can be a result of movement of one or more objects between the capture times of the two images. As movements are most likely to be caused by motion of the user 102, these changed regions are taken to indicate a foreground region of the depth image. This is discussed in more detail with reference to FIGS. 5 and 6 below.

The detected foreground region is then used as input to a geodesic background removal process 406, which uses a geodesic distance transform to select image elements that are in the foreground of the image (i.e. are part of the user 102), and remove those that are in the background (i.e. the background and other unwanted objects). This is discussed in detail with reference to FIGS. 5 to 10.

Following the geodesic background removal, the depth image has at least a portion of the background removed. However, some unwanted elements can still be present in the image. This is often the case where the user in direct contact with an object, for example when the user is sitting on a chair. In such cases, it is difficult for the geodesic background removal to distinguish between the image elements of the user and the object (e.g. chair). To counter this, a machine learning classifier is used to classify 408 each remaining image element as belonging to either the user or a foreground object. This is discussed in more detail with reference to FIGS. 11 to 14. The initial removal of the at least a portion of the background reduces the computational complexity of the classifier, as it can be applied only to those image that remain following the geodesic background removal. Note, however, that machine learning classifier can also be used without the geodesic background removal, albeit slower due to the larger number of image elements.

Once the image elements are classified, the wanted portion of the image (such as the user 102) can be isolated 410 from other objects (such as a chair). This then leaves an image comprising only the image elements relating to the user 102.

In the case that the depth image shows more than one user, then additional steps can be performed to detect the presence of more than one user, and separate 412 the image elements relating to each user. This is discussed in more detail with reference to FIGS. 15 and 16, hereinafter. Following this, image element masks showing each user individually (with backgrounds removed) can be outputted 414.

Figure 5:
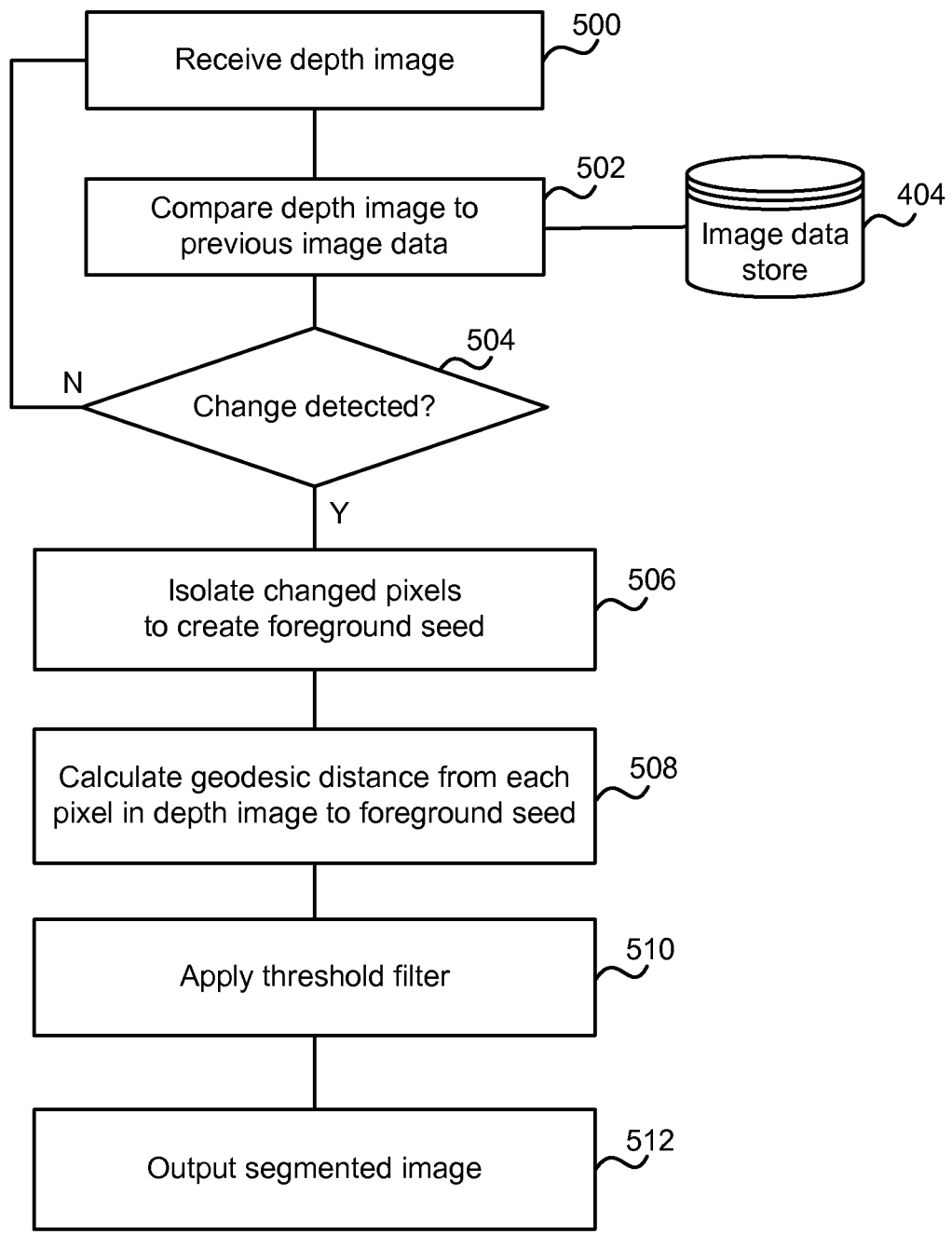
FIG. 5 illustrates a flowchart of a process for geodesic image segmentation.

Reference is now made to FIG. 5, which illustrates a flowchart of a process for segmenting a foreground portion from a background portion of an image using a geodesic distance transform, and which can be used to implement the first three blocks of FIG. 4.

Firstly, the depth image is received 500, and the received depth image is compared 502 to at least one previously stored depth image, stored at the image data store on the storage device 404. In one example, the received depth image is compared to the most recent previously received depth image (e.g. the previous frame in a video sequence of depth images). In another example, the received depth image is compared to several previously received depth images. In a further example, the image data store stores a depth image derived from a plurality of previously received depth images, in order to reduce storage requirements. For example, the image data store can store a depth image based on an exponential decay model, such as:

$$\overline{D}_t(x) = \alpha D_t(x) + (1-\alpha)\overline{D}_{t-1}(x)$$

Where $D_t(x)$ is a depth image received at time t, and $\alpha$ is a weighting value between 0 and 1. By using an exponential decay model, information from several depth images into the past can be taken into account, but more recent depth images are more prominently considered. In addition, the storage device 404 does not need to store many depth images, but can instead update $\overline{D}_t(x)$ each time a new depth image is received.

It is then detected 504 whether changes are present between the newly received depth image and the previous depth image. If no changes are detected, then the process waits for another new depth image (updating the exponential decay model if required). If changes are detected, however, then the image elements that have changed are isolated 506 to create one or more foreground "seed" regions, which are used in the subsequent processing. The seed regions are denoted hereinafter using the symbol $\Omega$. The seed regions are isolated by generating a binary seed mask (denoted M) having a value of 0 or 1 (other values can also be used), such that the mask has a value 0 for the image elements in the seed region of the depth image, and zero everywhere else in the image.

Changes in the depth images are caused by the movement of at least one object between the capture times of the two images. In the case of a camera-based control system, where the user 102 moves or gestures in front of the capture device 106, the detected changes are therefore are most likely to be caused by motion of the user 102. The changed regions (i.e. the seed regions) are therefore located in the depth image on the moving part of the user's body. The seed region can hence be used as an example of a portion a foreground region of the depth image.

Figure 6:
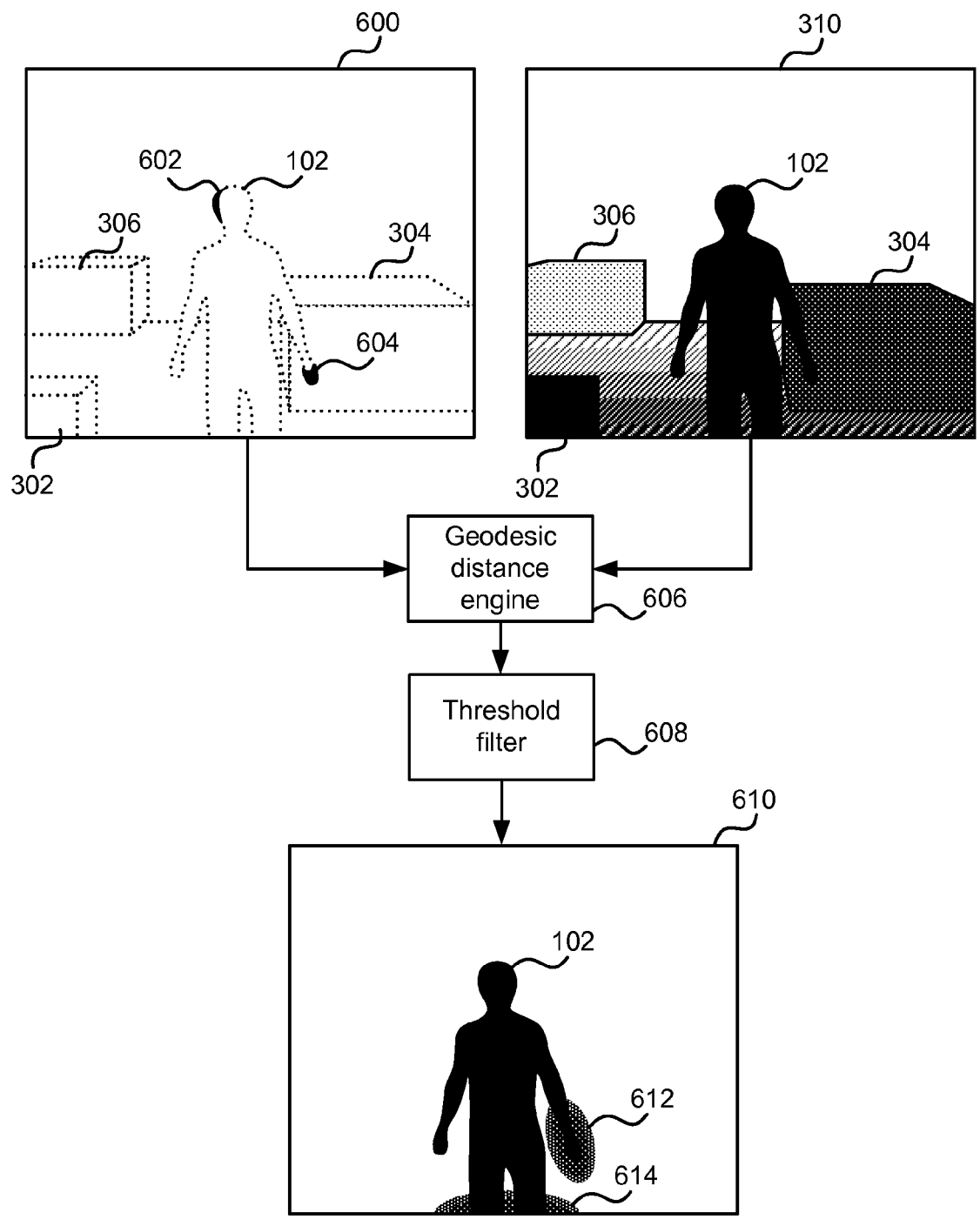
FIG. 6 illustrates the operation of the flowchart of FIG. 5 in the FIG. 3 scene.

An example of change detection and seed region generation is shown in FIG. 6. Binary seed mask 600 in FIG. 6 shows the result of the change detection for the scene shown in FIG. 3 for the illustrative case where the user 102 turns his head and moves his left hand. The outline of the user 102 and objects are shown with dotted lines for reference, but are not present in a real seed mask (as these items have not been moving). Seed mask 600 comprises two seed regions shown in black (e.g. having value 0). A first seed region 602 is shown at the side of the user's head, as a result of the turn of the head compared to the previous depth image, and a second seed region 604 is shown at the left hand of the user, as a result of the movement of this hand relative to the previous depth image. It should be noted that both of these seed regions are located on the body of the user, i.e. on the foreground part of the depth image that is to be segmented.

Once the seed mask has been generated, then a geodesic distance can be calculated 508 from each image element in the depth image to the nearest image element having a value of zero in the seed mask (i.e. any image element in black in seed mask 600 of FIG. 6). The term "geodesic distance" is used herein to refer to a distance between two points in an image which takes into account image content. For example, consider the depth values of the image elements as a 3-D height map. The shortest geodesic distance between two points in an image may then be one that travels around a region with a large depth change rather than a Euclidean shortest path which travels "as the crow flies". In the embodiments described herein the geodesic distances take into account the depth values in depth images. However, it is also possible to use geodesic distances which take into account gradients of other sources of information, such as intensity, texture gradients, color gradients, or gradients of probability maps.

In other words, the shortest distance is calculated between every image element in the depth image and any image element in the seed region, whilst talking into account the depth values. This means that the shortest geodesic distance can be one that follows a non-straight path over the image if that non-straight line does not have significant depth variations, rather than the straight line (Euclidean) path that has significant depth variations.

A geodesic distance transform can be used to determine the geodesic distances for the depth image. Any suitable geodesic distance transform can be used and an example of a known geodesic distance transform is set out below for ease of reference.

Given an image I defined on a 2-D domain $\Psi$, a binary seed mask M (with $M(x) \in \{0,1\} \forall x$) defining a seed region $\Omega$ with $x \in \Omega \Leftrightarrow M(x)=0$, the unsigned geodesic distance of each image element x from $\Omega$ is defined as:

$$D_0(x; M, I) = \min_{\{x' | M(x')=0\}} d(x, x'), \text{ with} \qquad (1)$$

$$d(a, b) = \inf_{\Gamma \in P_{a,b}} \int_0^{\gamma(\Gamma)} \sqrt{1 + \gamma^2 (\nabla I(s) \cdot \Gamma'(s))^2} \, ds \qquad (2)$$

Where $P_{a,b}$ is the set of all possible paths between the points a and b, and $\Gamma(s): \Re \rightarrow \Re^2$ indicating one such path, parameterized by the scalar $s \in [0,1]$. The spatial derivative $\Gamma'(s) = \partial \Gamma(s)/\partial s$ represents a vector tangent to the direction of the path. The dot-product in (2) ensures maximum influence for the gradient $\nabla I$ (i.e. the change in depth value between image elements) when it is parallel to the direction of the path $\Gamma$. The geodesic factor $\gamma$ weighs the contribution of the image gradient versus the spatial distances. For $\gamma=0$ equation (2) reduces to the Euclidean length of the path $\Gamma$.

To calculate the geodesic distance for depth images in real-time, a fast geodesic transform algorithm can be used. An example of such an algorithm is a raster-scan algorithm, as described below. Other types of algorithm can also be used, such as a wave-front algorithm.

Figure 7:
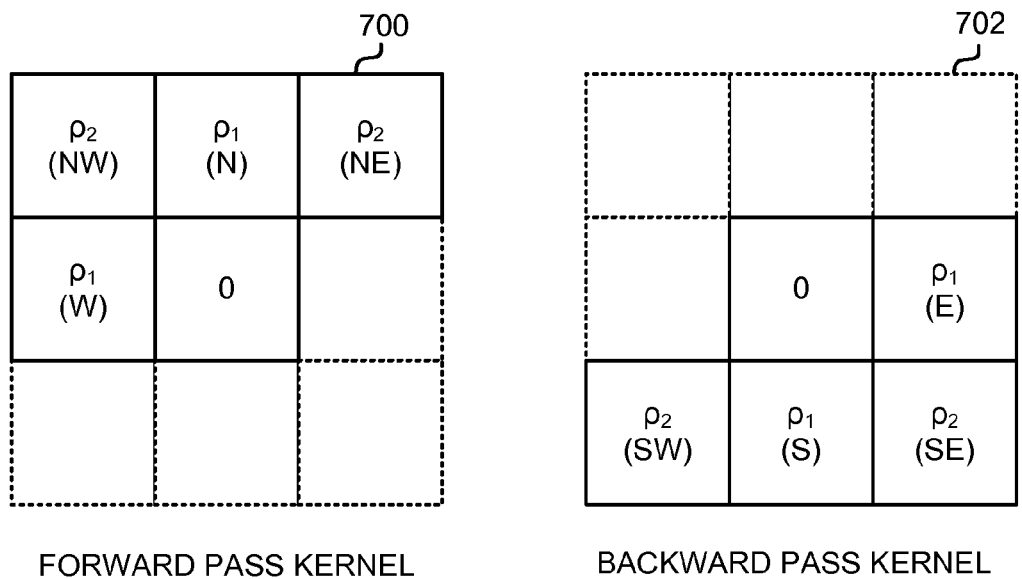
FIG. 7 illustrates a kernel used for calculating geodesic distances.
Figure 7:
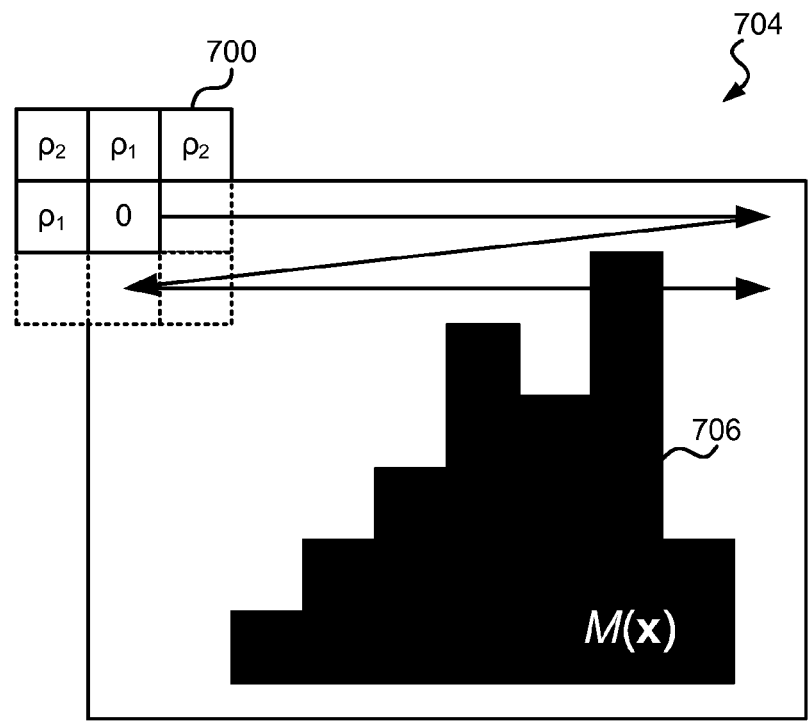

As mentioned, a raster-scan process can be used in order to produce the distance transform. A raster scan algorithm is one which is based on a kernel operation applied sequentially over the image in multiple passes. Distance transforms with various different metrics can be computed using raster scan algorithms by using windows or kernels of various different types and sizes. FIG. 7 shows an example pair of kernels (or windows) for use by a raster scan algorithm referred to herein as the Chamfer Distance algorithm. The pair comprises a forward pass kernel 700 and a backward pass kernel 702. This pair can be referred to as a chamfer 3×3 kernel. Many other different types of kernel can also be used including, but not limited to: city block, chessboard, chamfer 5×5 and chamfer 7×7. Larger kernels produce improved approximations to the exact distance with increasing accuracy.

A distance transform engine (which can be implemented on either the capture device 106 or computing device 104) selects a pair of windows for the raster scan, such as the forward pass kernel 700 and a backward pass kernel 702 of FIG. 7. In each window, "0" indicates the center of the window. The distance transform engine begins a forward raster scan over the depth image, as illustrated in example 704 in FIG. 7. It begins in the upper left corner of the image and places the forward pass kernel 700 on the depth image such that the center of the window is in registration with the first image element (in the top left corner). The kernel operation is carried out as described in more detail below. The window is then moved to the right so that the center of the window is in registration with the second image element of the top row and the kernel operation is carried out. This process repeats with the window moving from left to right along each row and from the top row to the bottom row of the depth image. When the forward raster scan ends the distance transform engine then carries out a backward raster scan over the depth image. The backward raster scan places the backward pass kernel 702 in the lower right corner of the depth image and moves from right to left and bottom to top.

The kernel operation comprises replacing the image element which falls under the central image element of the window by the minimum of five distance values, those distance values being for the image element locations specified by the window. For a geodesic distance transform, this can be calculated as follows.

Given a mask 706 $M(x) \in [0,1]$ (which can be, for example, a seed mask 600 as shown in FIG. 6), in the forward pass the mask 706 and the underlying depth image I is scanned from the top-left to the bottom-right corner and an intermediate function C is iteratively constructed as follows:

$$C(x, y) = \min \begin{cases} C(x-1, y-1) + \sqrt{\rho_2^2 + \gamma \nabla I_{NW}(x, y)^2} \\ C(x, y-1) + \sqrt{\rho_1^2 + \gamma \nabla I_{N}(x, y)^2} \\ C(x+1, y-1) + \sqrt{\rho_2^2 + \gamma \nabla I_{NE}(x, y)^2} \\ C(x-1, y) + \sqrt{\rho_1^2 + \gamma \nabla I_{W}(x, y)^2} \\ \nu M(x, y) \end{cases}$$

Where $\nabla I_{NW}$ denotes the image gradient (i.e. change in depth) between the image element at the centre of the window and the image element to the north-west, as illustrated in the forward pass kernel 700 of FIG. 7. Similar calculations are made for the north, north-east and west components. $\rho_1$ and $\rho_2$ are local distance values, and in one example are set to $\rho_1=1$ and $\rho_2=\sqrt{2}$ or fixed-point approximations thereof. In other example, alternative values can be used. The symbol $\gamma$ represents the geodesic factor which weighs the contribution of the image gradient versus the spatial distances. The symbol $\nu$ represents a scaling factor which can be set to any suitable value.

Once the forward pass is completed, and the values for C(x, y) have been calculated, then the backward pass is performed. In the backward pass the algorithm proceeds right-to-left along scan-lines from the bottom-right to the top-left corner and applies the backward pass kernel 702 to the values for C(x, y) to produce the final geodesic distance D(x).

Referring once more to FIG. 5, once the geodesic distance transform has been performed, then the output is a distance image in which each image element has a value that indicates its geodesic distance to the seed region. This can be represented graphically, such that short geodesic distances are given a low intensity (e.g. black for zero distance), long geodesic distances are given a high intensity (e.g. white for large distances), and geodesic distances between these extremes are gives a corresponding grey-scale value.

Therefore, for image elements on the body of the user, the geodesic distance is short, as these elements are approximately the same depth from the seed regions (which were also on the body), and hence the geodesic path can simply travel along the body a short distance. Conversely, objects that are not connected to the user have a large geodesic distance, as the geodesic path takes into account the jump in depth off the user (e.g. to the background) and then onto the object. This is the case even if the object is at the same depth as (but not connected to) the user, as was the case with the first object 302 in FIG. 3. Therefore, ideally, the distance image shows the body of the user with a low intensity, and the remainder of the image with a high intensity. Limitations to this are discussed below.

To remove the background from the image a threshold filter 510 is used on the distance image. In other words, all image elements having a geodesic distance greater than a predefined threshold are removed from the image. This leaves a set of image elements that predominantly correspond to the user 102. The shape created by these image elements can be used to create an output user mask, which can then be used on the original depth image to segment the depth image into those image elements under the user mask (which are labeled as foreground image elements) and those outside the mask (which are labeled as background image elements). The segmented depth image can then be outputted 512.

An example of the result of the geodesic background removal process of FIG. 5 being applied to the scene of FIG. 3 is shown in FIG. 6. In this illustrative example, the seed mask 600 having seed regions at the head and hand of the user 102 (as discussed above) is input to a geodesic distance engine 606 along with the depth image 310. The output from the geodesic distance engine 606 is a distance image. The distance image is then applied to a threshold filter 608, and the output is a thresholded distance image 610.

The thresholded distance image 610 shows the body of the user 102 in black, due to the short geodesic distance of all image elements of the body to one of the seed regions. However, it should be noted that the thresholded distance image 610 also shows some "bleeding" 612 into the second object 304 and also some bleeding into the floor 614. This is because the user is overlapping with the second object 304 in the image, and the depth gradient to the second object 304 is not that large. Similarly, for the floor, the user is in contact with the floor and hence there is a similar depth value, and thus short geodesic distance. Such bleeding can be mitigated to an extent with careful selection of the threshold filter parameter, and also with other enhancements described hereinafter.

The geodesic background removal process of FIG. 5 improves upon the flood fill technique described hereinbefore because it is tolerant of disconnected regions of foreground. For example, a bent or outstretched arm or leg does not result in parts of the user being skipped from the foreground, as the geodesic distance path travels along the "surface" of the user's body, and results in a short geodesic distance back to the seed region (provided the thresholding is sufficient). Similarly, bleeding effects are not as severe because a bleed will not always run across the whole of an object, as the geodesic distance gets larger as the image elements get further away from the seed region in the x and y as well as depth dimensions. Therefore, as a bleed spreads into an object the distance increases, and will at some point get large enough to be filtered by the threshold filter.

Furthermore, the geodesic distance transform technique is also more computationally efficient than the flood-fill technique. The geodesic distance transform processing requirements increase linearly with the number of image elements (i.e. O(n) growth). The geodesic distance transform also accesses memory in a contiguous manner, and does not require complex recursion. Additionally, the geodesic distance transform is parallelizable, and hence can be efficiently implement on one or more GPUs.

Figure 8:
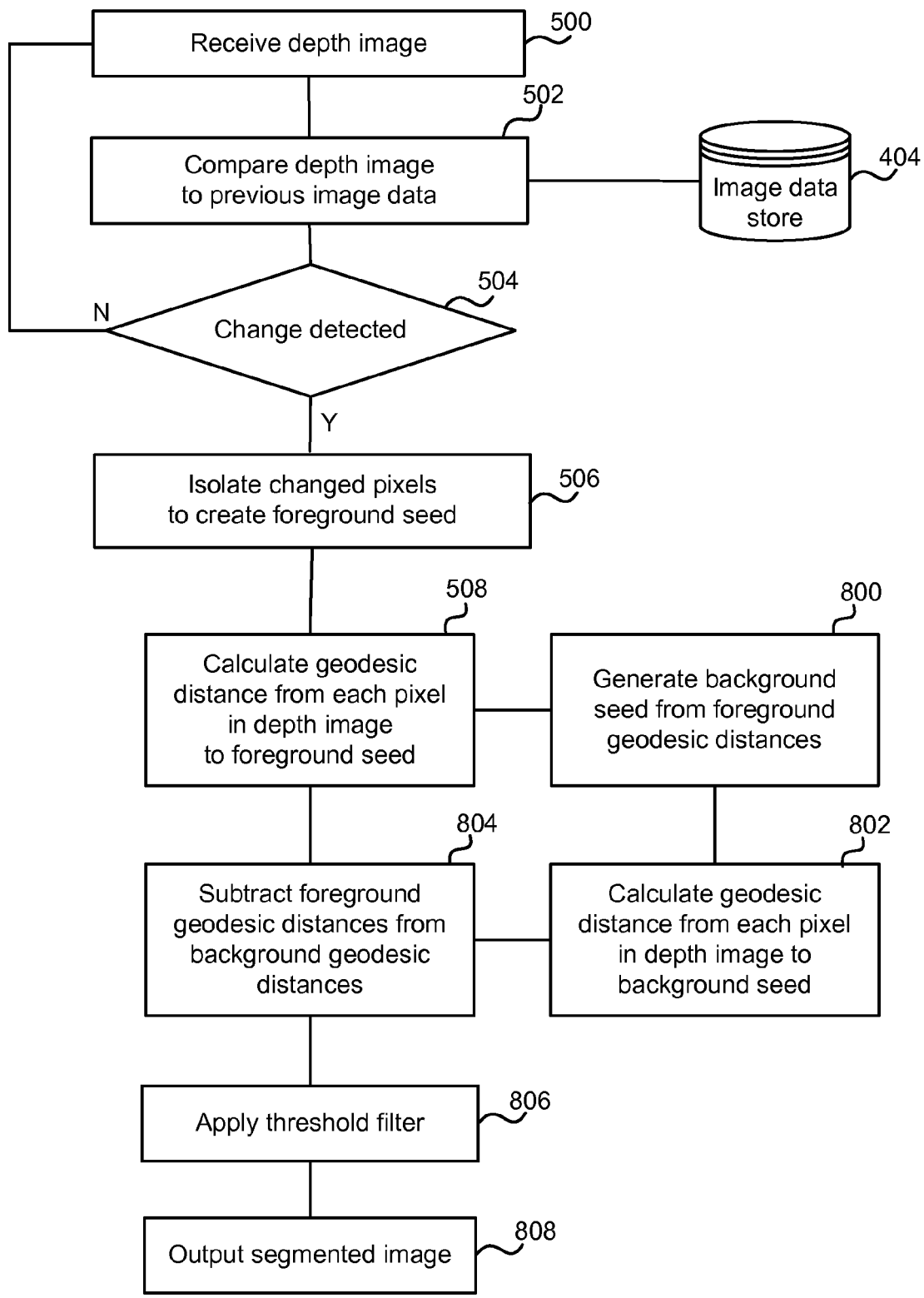
FIG. 8 illustrates a flowchart of a process for symmetric geodesic image segmentation.
Figure 9:
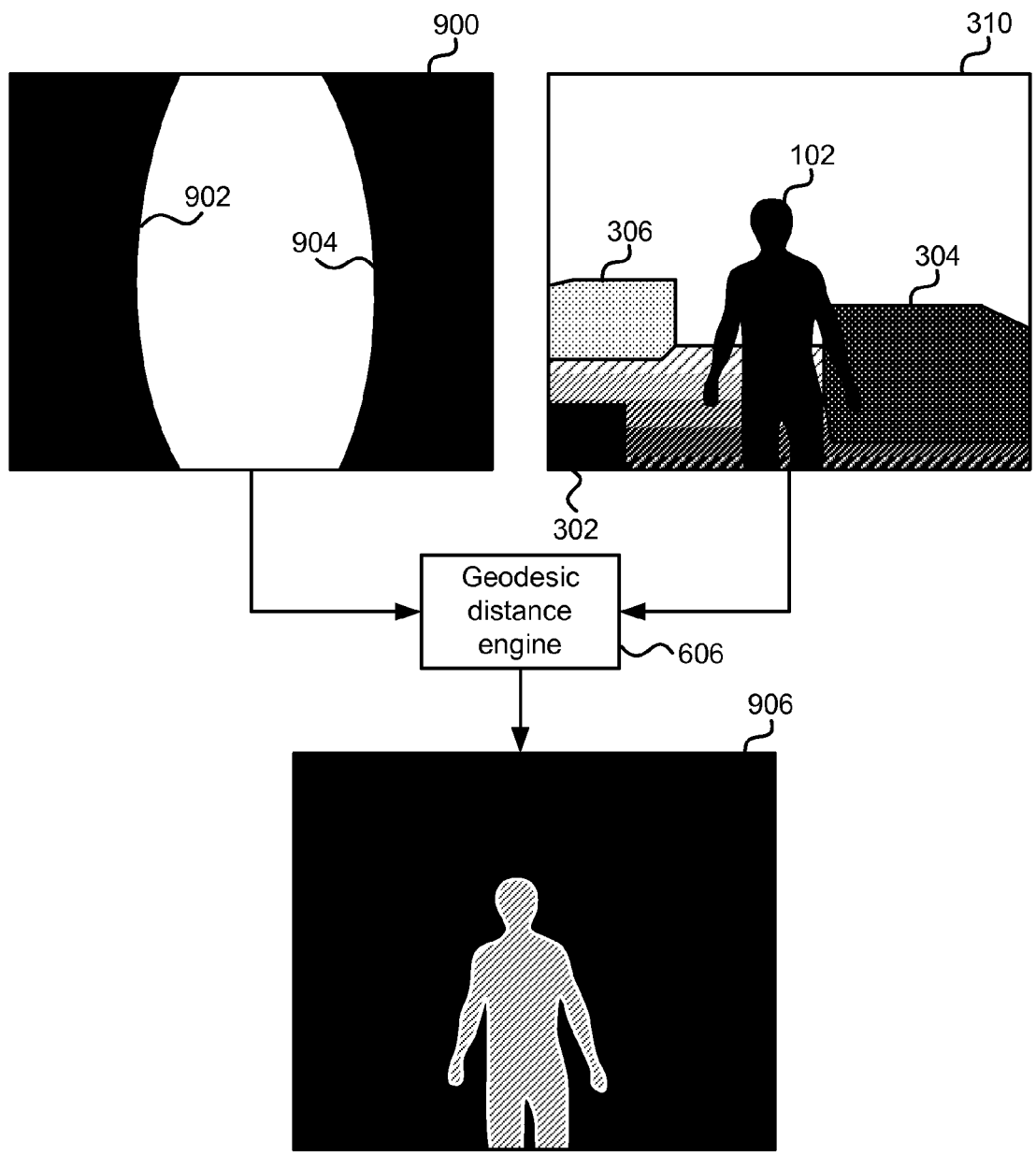
FIG. 9 illustrates calculation of a geodesic distance from a background seed in the FIG. 3 scene.

Reference is now made to FIG. 8, which illustrates a flowchart of a process for enhancing the geodesic distance transform technique above to further mitigate bleeding effects. This technique is denoted symmetric geodesic image segmentation. The flowchart of FIG. 8 shares the same first five blocks as the process of FIG. 5 described above. Summarizing, the depth image is received 500, compared 502 to a previously received image, and if a change is detected 504 then the changed image elements are isolated 506 and the seed mask is created and a geodesic distance image calculated 508 in the manner described in detail above. In the flowchart of FIG. 8, this is denoted the foreground geodesic distance image.

Once the foreground geodesic distance image has been calculated, a "background seed" is generated 800. The background seed is a different seed to that calculated by the movement of the user, and is intended to map to the location of the background in the image. In one example, the background seed can be calculated by selecting a predefined shape that partially surrounds at least a central portion of the foreground geodesic distance image. An example of such a shape is shown illustrated in FIG. 9, where a background seed mask 900 comprises a first concave shape 902 and second concave 904 arranged to fit around the portion of the foreground geodesic distance image having the shortest geodesic distances (i.e. the user's body). Other shapes that lie in the background of the image can also be used, and the size of the selected shapes can be changed in dependence on the foreground geodesic distance image.

The background seed mask is then used to calculate 802 geodesic distances from each image element in the depth image to the background seed. This is performed in the same manner as described above with reference to FIGS. 5 to 7. The result of this operation is a background geodesic distance image. An example of this operation is shown illustrated in FIG. 9. The background seed mask 900 and the depth image 310 are input to the geodesic distance engine 606, and a background geodesic distance image 906 is output. In contrast with the foreground geodesic distance image, the background and objects under the background seed have a low intensity, due to the short geodesic distance to the background seed, whereas the user 102 (which is not connected to the background seed) has a higher intensity due to the larger geodesic distance. Therefore, the generation of the background geodesic distance image can be seen as a type of negative or inverse of the foreground geodesic distance image.

Figure 10:
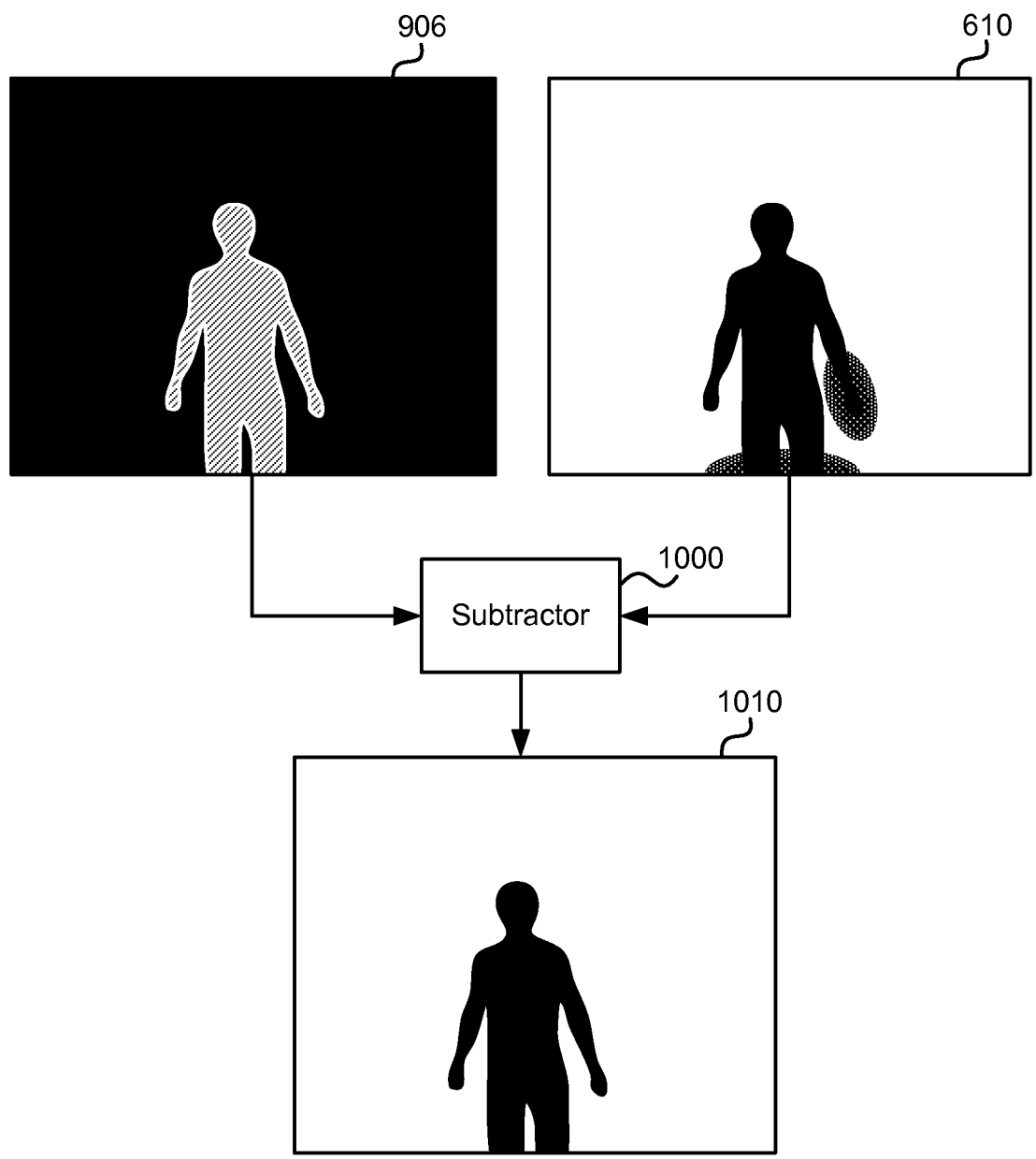
FIG. 10 illustrates the combination of background and foreground seed geodesic distances in the FIG. 3 scene.

When the background geodesic distance image has been generated, the foreground geodesic distance image is subtracted 804 from the background geodesic distance image. The result of this is illustrated in FIG. 10, where the background geodesic distance image 906 and foreground geodesic distance image 610 (suffering from bleeding) are applied to a subtractor 1000. The output is a final geodesic distance image 1010, in which the bleeding has been reduced or removed. This occurs because the body of the user 102 has opposite values in the two distance images (high intensity in the background geodesic distance image 906 and low intensity in the foreground geodesic distance image 610), resulting in a high difference value. Conversely, the bleed portions have low intensity in both distance images, resulting in a low difference result.

Once the distance images have been subtracted, then the final geodesic distance image 1010 can be thresholded 806 using a threshold filter, and an output user mask generated. The output user mask can then be used on the original depth image to segment the depth image into those image elements under the user mask (which are labeled as foreground image elements) and those outside the mask (which are labeled as background image elements). The segmented depth image can then be outputted 808.

The symmetric geodesic image segmentation technique reduces bleeding effects significantly, and still operates in a computationally efficient manner due to the use of the efficient geodesic distance transforms. However, bleeding effects can still occur in some circumstances, for example where the user is in direct contact with an object. This can occur for example when the user is sitting on a chair. In these cases, the geodesic distance to the image elements of the chair is still short, and hence the chair is not segmented from the user. To counter this, a machine learning classifier is used to classify the image elements in the segmented image, and enable separation of the user from the object. This is now described with reference to FIGS. 11 to 14.

The machine learning classifier used herein is a random decision forest. However, in other examples, alternative classifiers could also be used. In further examples, rather than using a decision forest, a single trained decision tree can be used (this is equivalent to a forest with only one tree in the explanation below). Whilst some classifier algorithms can be computationally complex, the computational expense has been reduced in this example because the geodesic distance segmentation technique has already removed most of the background image elements from the image, and hence the number of image elements to be analyzed by the classifier is significantly reduced.

Before a random decision forest classifier can be used to classify image elements, a set of decision trees that make up the forest are trained. The tree training process is described below with reference to FIGS. 11 and 12.

Figure 11:
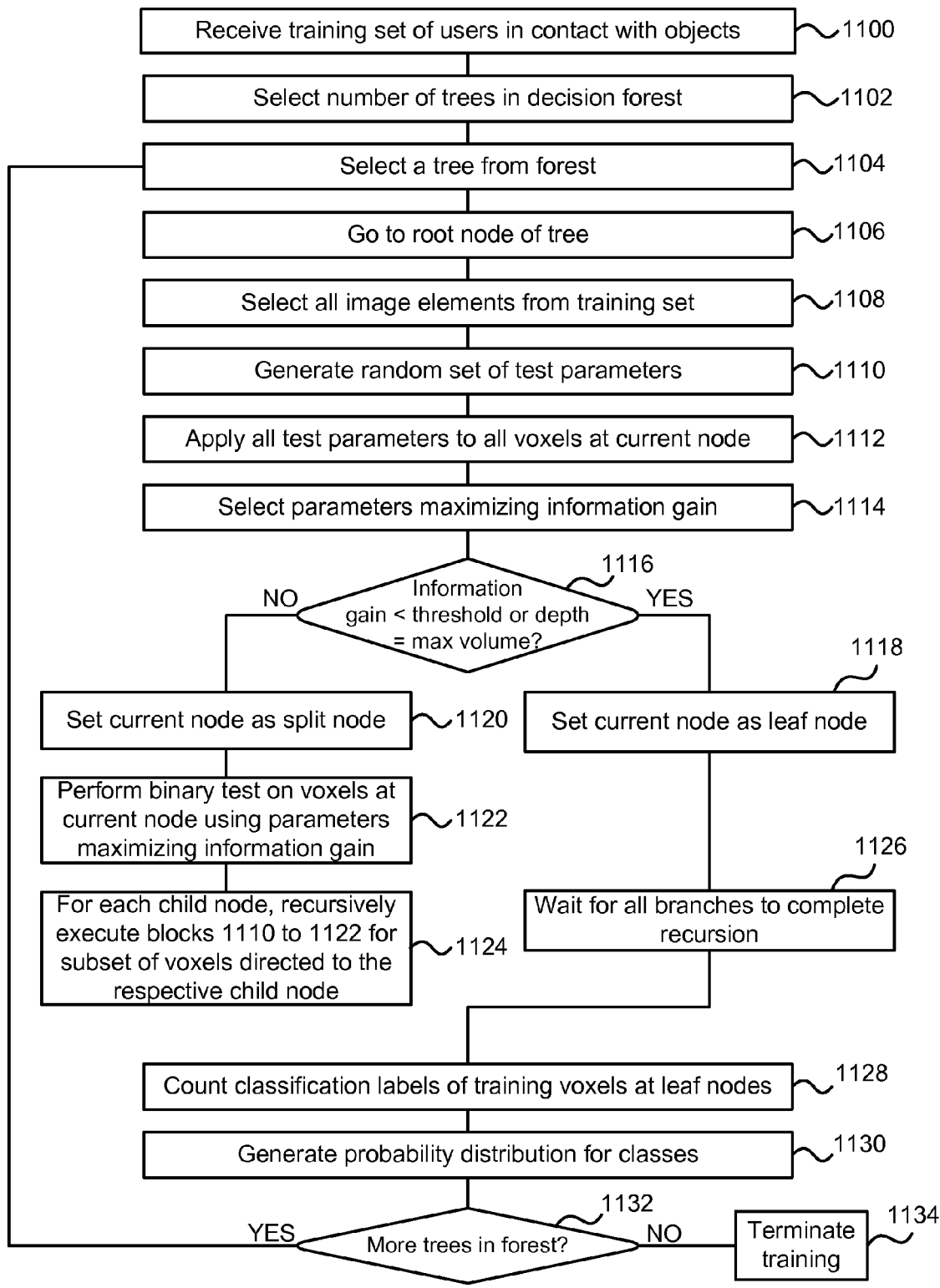
FIG. 11 illustrates a process for training an image classifier for foreground objects.

FIG. 11 illustrates a flowchart of a process for training a decision forest to identify features in an image. The decision forest is trained using a set of training images. The set of training images comprise a plurality images each showing at least one user and at least one object in proximity to the user.

The objects in the training images are selected to be typical objects that are found in the home, and can be expected to be seen in the depth images in a camera-based control system. Examples of such objects are furniture, such as chairs, tables (e.g. coffee tables), couches/sofas and the like. The training images can also include floors and walls of a room. The users in the training images are in various different poses (such as sitting or standing). Each image element in each image in the training set is labeled as belonging to either the user (or optionally which body part of the user), a foreground object (the sofas/couches, chairs, coffee tables, other furniture, floors, walls etc), or background. Therefore, the training set forms a ground-truth database.

In one example, rather than capturing depth images for many different examples of user poses, different furniture etc., the training set can comprise synthetic computer generated images. Such synthetic images realistically model the human body in different poses interacting with different objects, and can be generated to be viewed from any angle or position. However, they can be produced much more quickly than real depth images, and can provide a wider variety of training images.

Referring to FIG. 11, to train the decision trees, the training set described above is first received 1100. The number of decision trees to be used in a random decision forest is selected 1102. A random decision forest is a collection of deterministic decision trees. Decision trees can be used in classification algorithms, but can suffer from over-fitting, which leads to poor generalization. However, an ensemble of many randomly trained decision trees (a random forest) yields improved generalization. During the training process, the number of trees is fixed.

The following notation is used to describe the training process. An image element in a image I is defined by its coordinates x=(x, y). The forest is composed of T trees denoted $\Psi_1, \ldots, \Psi_t, \ldots, \Psi_T$ with t indexing each tree. An example random decision forest is shown illustrated in FIG. 12. The illustrative decision forest of FIG. 12 comprises three decision trees: a first tree 1200 (denoted tree $\Psi_1$); a second tree 1202 (denoted tree $\Psi_2$); and a third tree 1204 (denoted tree $\Psi_3$). Each decision tree comprises a root node (e.g. root node 1206 of the first decision tree 1200), a plurality of internal nodes, called split nodes (e.g. split node 1208 of the first decision tree 1200), and a plurality of leaf nodes (e.g. leaf node 1210 of the first decision tree 1200).

In operation, each root and split node of each tree performs a binary test on the input data and based on the result directs the data to the left or right child node. The leaf nodes do not perform any action; they just store probability distributions (e.g. example probability distribution 1212 for a leaf node of the first decision tree 1200 of FIG. 12), as described hereinafter.

The manner in which the parameters used by each of the split nodes are chosen and how the leaf node probabilities are computed is now described. A decision tree from the decision forest is selected 1104 (e.g. the first decision tree 1200) and the root node 1206 is selected 1106. All image elements from each of the training images are then selected 1108. Each image element x of each training image is associated with a known class label, denoted Y(x). The class label indicates whether or not the point x belongs to the user (or optionally which body part of the user), a foreground object (the sofas/couches, chairs, coffee tables, other furniture, floors, walls etc), or background. Thus, for example, Y(x) indicates whether an image element x belongs to the class of head, foreground object, wall, left arm, right hand, floor, etc.

A random set of test parameters are then generated 1110 for use by the binary test performed at the root node 1206. In one example, the binary test is of the form: $\xi > f(x; \theta) > \tau$, such that $f(x; \theta)$ is a function applied to image element x with parameters $\theta$, and with the output of the function compared to threshold values $\xi$ and $\tau$. If the result of $f(x; \theta)$ is in the range between $\xi$ and $\tau$ then the result of the binary test is true. Otherwise, the result of the binary test is false. In other examples, only one of the threshold values $\tau$ and $\tau$ can be used, such that the result of the binary test is true if the result of $f(x; \theta)$ is greater than (or alternatively less than) a threshold value. In the example described here, the parameter v defines a visual feature of the image.

An example function $f(x; \theta)$ can make use of the relative position of users and objects in the depth images. The parameter $\theta$ for the function $f(x; \theta)$ is randomly generated during training. The process for generating the parameter $\theta$ can comprise generating random spatial offset values in the form of a two-dimensional displacement (i.e. an angle and distance). The result of the function $f(x; \theta)$ is then computed by observing the depth value for a test image element which is displaced from the image element of interest x in the image by the spatial offset. The depth value for the test image element can indicate whether the test image element is in the background of the image. The threshold values $\xi$ and $\tau$ can be used to decide whether the test image element is at the background depth.

This example function illustrates how the features in the images can be captured by considering the relative layout of visual patterns. For example, chair image elements tend to occur a certain distance away, in a certain direction, from the torso and upper legs of the body, and floor image elements tend to occur a certain distance away, in a certain direction, from the lower leg and foot image elements.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter $\theta$ and the threshold values $\xi$ and $\tau$. In order to inject randomness into the decision trees, the function parameters $\theta$ of each split node are optimized only over a randomly sampled subset $\Theta$ of all possible parameters. This is an effective and simple way of injecting randomness into the trees, and increases generalization.

Then, every combination of test parameter is applied 1112 to each image element in the set of training images. In other words, all available values for $\theta$ (i.e. $\theta_i \in \Theta$) are tried one after the other, in combination with all available values of $\xi$ and $\tau$ for each image element in each training image. For each combination, the information gain (also known as the relative entropy) is calculated. The combination of parameters that maximize the information gain (denoted $\theta^*$, $\xi^*$ and $\tau^*$) is selected 1114 and stored at the current node for future use. This set of test parameters provides discrimination between the image element classifications. As an alternative to information gain, other criteria can be used, such as Gini entropy, or the 'two-ing' criterion.

It is then determined 1116 whether the value for the maximized information gain is less than a threshold. If the value for the information gain is less than the threshold, then this indicates that further expansion of the tree does not provide significant benefit. This gives rise to asymmetrical trees which naturally stop growing when no further nodes are beneficial. In such cases, the current node is set 1118 as a leaf node. Similarly, the current depth of the tree is determined 1116 (i.e. how many levels of nodes are between the root node and the current node). If this is greater than a predefined maximum value, then the current node is set 1118 as a leaf node.

If the value for the maximized information gain is greater than or equal to the threshold, and the tree depth is less than the maximum value, then the current node is set 1120 as a split node. As the current node is a split node, it has child nodes, and the process then moves to training these child nodes. Each child node is trained using a subset of the training image elements at the current node. The subset of image elements sent to a child node is determined using the parameters $v^*, \xi^*$ and $\tau^*$ that maximized the information gain. These parameters are used in the binary test, and the binary test performed 1122 on all image elements at the current node. The image elements that pass the binary test form a first subset sent to a first child node, and the image elements that fail the binary test form a second subset sent to a second child node.

For each of the child nodes, the process as outlined in blocks 1110 to 1122 of FIG. 11 are recursively executed 1124 for the subset of image elements directed to the respective child node. In other words, for each child node, new random test parameters are generated 1110, applied 1112 to the respective subset of image elements, parameters maximizing the information gain selected 1114, and the type of node (split or leaf) determined 1116. If it is a leaf node, then the current branch of recursion ceases. If it is a split node, binary tests are performed 1122 to determine further subsets of image elements and another branch of recursion starts. Therefore, this process recursively moves through the tree, training each node until leaf nodes are reached at each branch. As leaf nodes are reached, the process waits 1126 until the nodes in all branches have been trained. Note that, in other examples, the same functionality can be attained using alternative techniques to recursion.

Once all the nodes in the tree have been trained to determine the parameters for the binary test maximizing the information gain at each split node, and leaf nodes have been selected to terminate each branch, then probability distributions can be determined for all the leaf nodes of the tree. This is achieved by counting 1128 the class labels of the training image elements that reach each of the leaf nodes. All the image elements from all of the training images end up at a leaf node of the tree. As each image element of the training images has a class label associated with it, a total number of image elements in each class can be counted at each leaf node. From the number of image elements in each class at a leaf node and the total number of image elements at that leaf node, a probability distribution for the classes at that leaf node can be generated 1130. To generate the distribution, the histogram is normalized. Optionally, a small prior count can be added to all classes so that no class is assigned zero probability, which can improve generalization.

Figure 12:
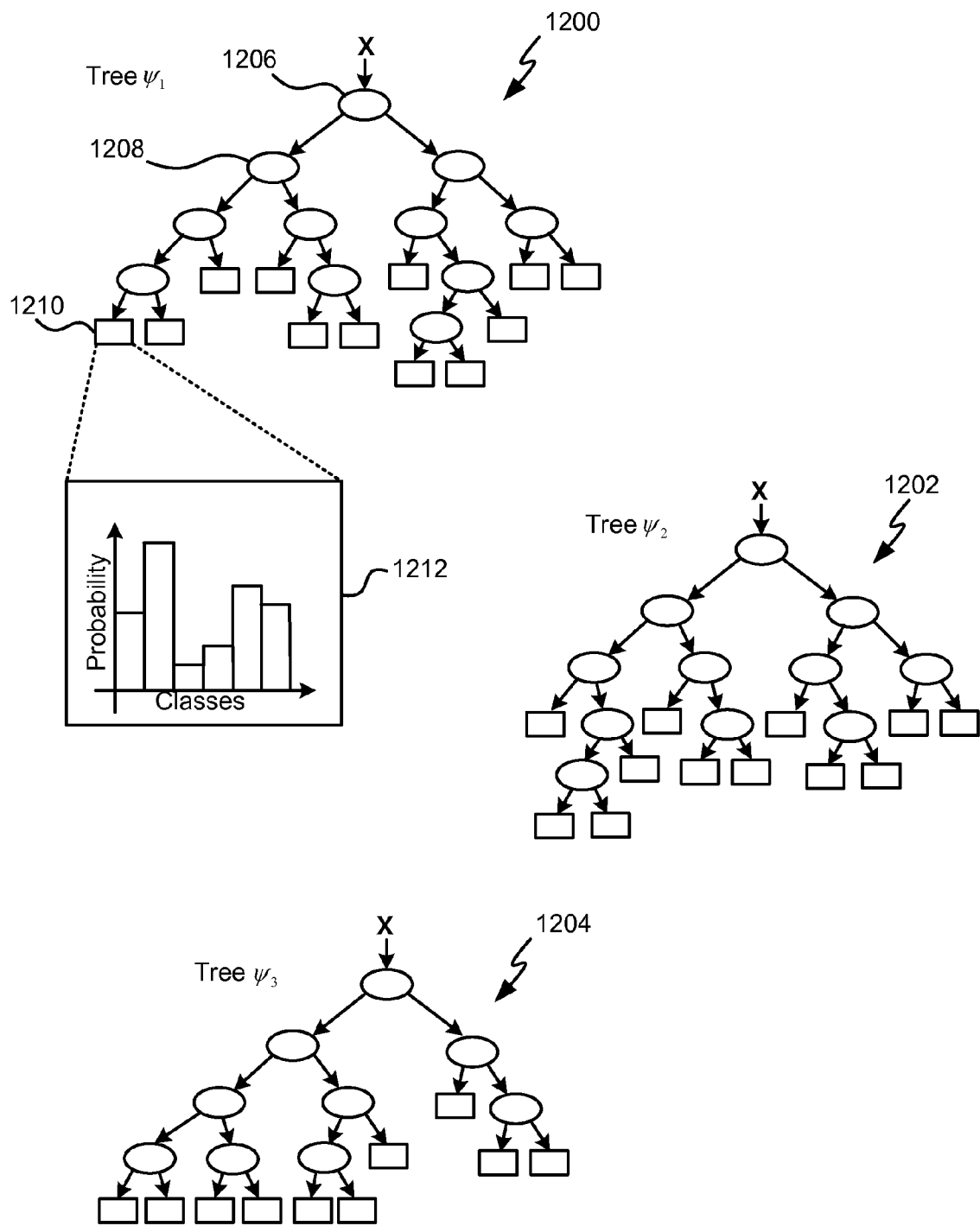
FIG. 12 illustrates example trained decision trees.

An example probability distribution 1212 is shown illustrated in FIG. 12 for leaf node 1210. The probability distribution shows the classes c of image elements against the probability of an image element belonging to that class at that leaf node, denoted as $P_{l_t(x)}(Y(x)=c)$, where $l_t$ indicates the leaf node l of the $t^{th}$ tree. In other words, the leaf nodes store the posterior probabilities over the classes being trained. Such a probability distribution can therefore be used to determine the likelihood of an image element reaching that leaf node belonging to a given classification, as described in more detail hereinafter.

Returning to FIG. 11, once the probability distributions have been determined for the leaf nodes of the tree, then it is determined 1132 whether more trees are present in the decision forest. If so, then the next tree in the decision forest is selected, and the process repeats. If all the trees in the forest have been trained, and no others remain, then the training process is complete and the process terminates 1134.

Therefore, as a result of the training process, a plurality of decision trees are trained using synthesized training images. Each tree comprises a plurality of split nodes storing optimized test parameters, and leaf nodes storing associated probability distributions. Due to the random generation of parameters from a limited subset used at each node, the trees of the forest are distinct (i.e. different) from each other.

Figure 13:
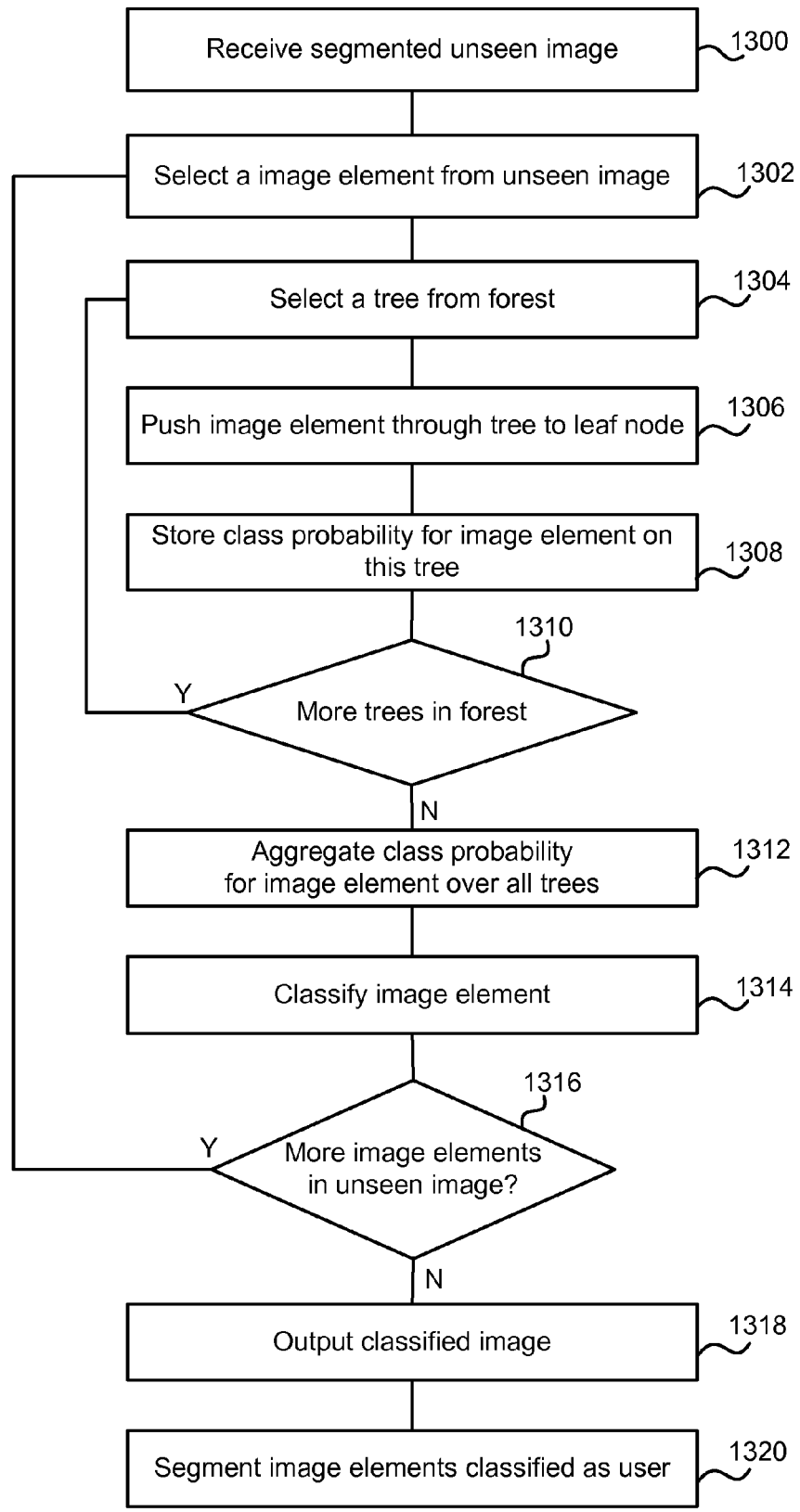
FIG. 13 illustrates a process for classifying image elements using trained decision trees.

The training process is performed in advance of using the classifier algorithm to segment a real depth image. The decision forest and the optimized test parameters are stored on a storage device for use in classifying depth images at a later time. FIG. 13 illustrates a flowchart of a process for classifying image elements in a previously unseen depth image using a decision forest that has been trained as described hereinabove. Firstly, an unseen depth image is received 1300 at the classification algorithm. An image is referred to as 'unseen' to distinguish it from a training image which has the image elements already classified. Note that the unseen depth image can be already segmented to an extent, for example by a geodesic transform process described above, which reduces the number of image elements to be classified. However, the classification process can also be used without the prior segmentation step in some examples.

An image element from the unseen image is selected 1302 for classification. A trained decision tree from the decision forest is also selected 1304. The selected image element is pushed 1306 through the selected decision tree (in a manner similar to that described above with reference to FIGS. 11 and 12), such that it is tested against the trained parameters at a node, and then passed to the appropriate child in dependence on the outcome of the test, and the process repeated until the image element reaches a leaf node. Once the image element reaches a leaf node, the probability distribution associated with this leaf node is stored 1308 for this image element.

If it is determined 1310 that there are more decision trees in the forest, then a new decision tree is selected 1304, the image element pushed 1306 through the tree and the probability distribution stored 1308. This is repeated until it has been performed for all the decision trees in the forest. Note that the process for pushing an image element through the plurality of trees in the decision forest can also be performed in parallel, instead of in sequence as shown in FIG. 13.

Once the image element has been pushed through all the trees in the decision forest, then a plurality of classification probability distributions have been stored for the image element (at least one from each tree). These probability distributions are then aggregated 1312 to form an overall probability distribution for the image element. In one example, the overall probability distribution is the mean of all the individual probability distributions from the T different decision trees. This is given by:

$$P(Y(x) = c) = \frac{1}{T}\sum_{t=1}^{T} P_{l_t(x)}(Y(x) = c)$$

Note that methods of combining the tree posterior probabilities other than averaging can also be used, such as multiplying the probabilities. Optionally, an analysis of the variability between the individual probability distributions can be performed (not shown in FIG. 13). Such an analysis can provide information about the uncertainty of the overall probability distribution. In one example, the entropy can be determined as a measure of the variability.

Once the overall probability distribution is determined, the overall classification of the image element is calculated 1314 and stored. The calculated classification for the image element is assigned to the image element for future use (as outlined below). In one example, the calculation of a classification c for the image element can be performed by determining the maximum probability in the overall probability distribution (i.e. $P_c$=max. P(Y(x)=c). In addition, the maximum probability can optionally be compared to a threshold minimum value, such that an image element having class c is considered to be present if the maximum probability is greater than the threshold. In one example, the threshold can be 0.5, i.e. the classification c is considered present if $P_c$>0.5. In a further example, a maximum a-posteriori (MAP) classification for an image element x can be obtained as c*=arg $\max_c$ P(Y(x)=c).

It is then determined 1316 whether further unanalyzed image elements are present in the unseen depth image, and if so another image element is selected and the process repeated. Once all the image elements in the unseen image have been analyzed, then classifications are obtained for all image elements.

To perform the final segmentation of the depth image, the image element classifications are used to segment 1320 the image such that the image elements having classifications relating to the user are labeled as foreground portions of the image, and the remaining image elements (i.e. those classified as sofas/couches, chairs, coffee tables, other furniture, floors, walls, etc.) are classified as background portions of the image. The foreground portion having the user image elements can be used to generate a mask, and separate the user from the original depth image for processing to analyze pose and/or movement.

Figure 14:
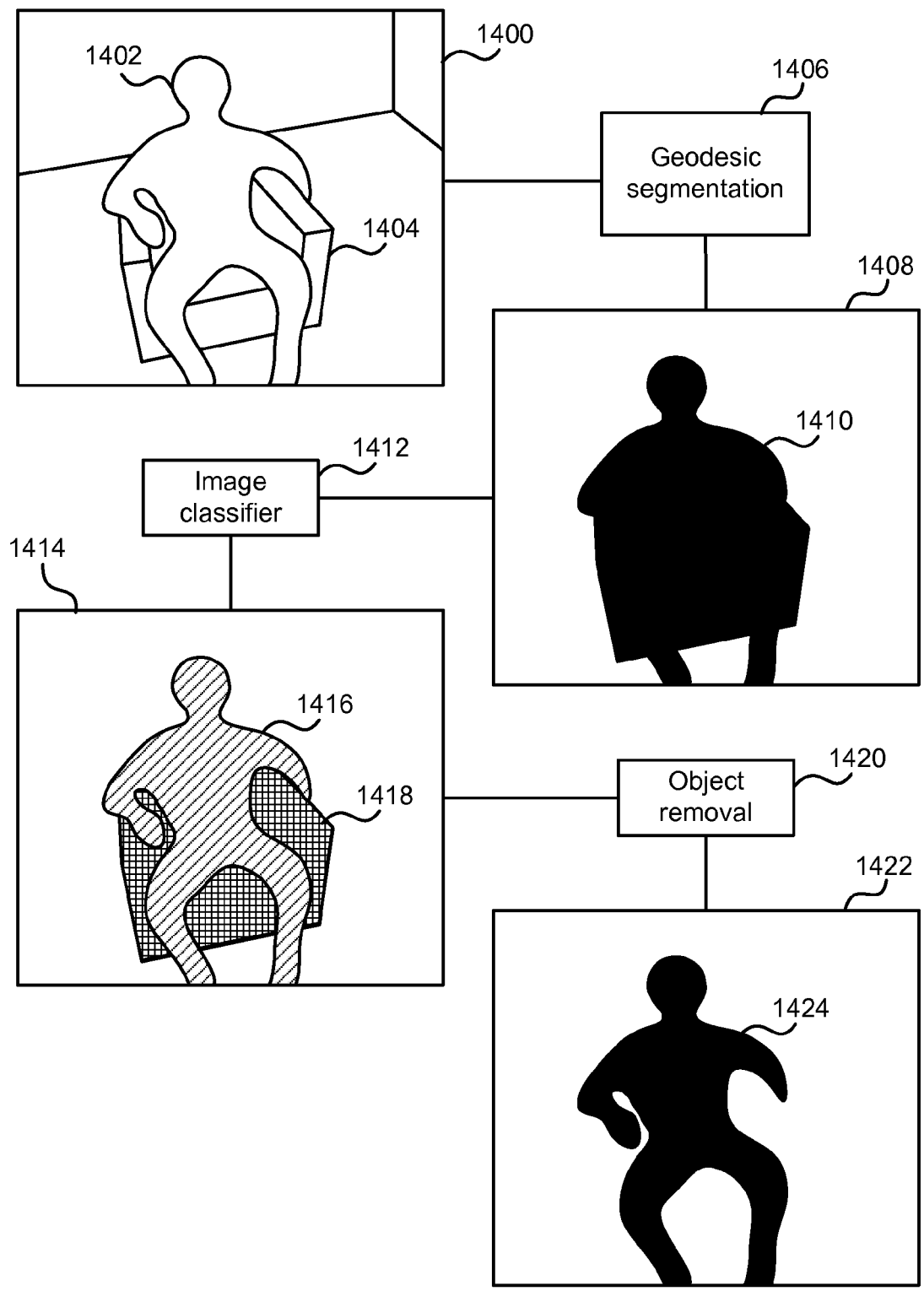
FIG. 14 illustrates an example scene with foreground object removal.

An illustrative example of the overall operation of the segmentation process (as first discussed with reference to FIG. 4 is shown in FIG. 14. In this example, a depth image 1400 that comprises a user 1402 sitting on a chair 1404 is captured, and provided to the image segmentation system. The depth image 1400 is then subjected to a first stage segmentation using the geodesic distance transform 1406 as described hereinabove. The result of this is a partially segmented image 1408 with a foreground mask 1410, which has correctly removed the background from the depth image 1400, but the foreground object (the chair 1404) has not been removed as it was in direct contact with the user 1402, and could not be distinguished by the geodesic distance transform.

The second stage of the segmentation then uses the image classifier 1412, as described hereinabove, to classify the image elements of the partially segmented image 1408. The result of the image classifier 1412 is a classified image 1414, in which each image element from the partially segmented image 1408 is given a label of "user" or "foreground object" (in this illustrative example only—other examples can use more or different labels). In the classified image 1414 the image elements classified as user 1416 are given diagonal shading, and the image elements classified as foreground object 1418 are given check shading.

Once the image is classified, objects (i.e. items other than the user) can be removed 1420, which leaves a final segmented image 1422 comprising a user mask 1424 comprising (predominantly) only the image elements relating to the user 1402. The user mask 1424 can then be used to extract the user's image elements from the original depth image 1400, and the depth image comprising only the user can be processed further to control the operation of the computing device through movements, poses or gestures.

It should be noted that whilst the geodesic image segmentation technique and the image classifier segmentation technique work well in combination, due to the fast geodesic transform performing a "first pass" to remove much of the background, thereby reducing the processing requirements for the image classifier, they can also each be used independently as image segmentation techniques. In addition, both of these techniques can also be used for images other than depth images, such as RGB images. It should also be appreciated that these techniques can be readily applied to videos, in that a video is merely a sequence of images.

A final part of the image segmentation system is now described with reference to FIGS. 15 and 16. The previous segmentation stages have removed the background and any unwanted objects from the depth image showing the user. However, it is also possible that the depth image shows more than one user. Therefore, if the original depth image shows more than one user, then, following segmentation, the segmented image also contains image elements relating to more than one user. The process of FIG. 15 identifies this circumstance, and separates the users.

Figure 15:
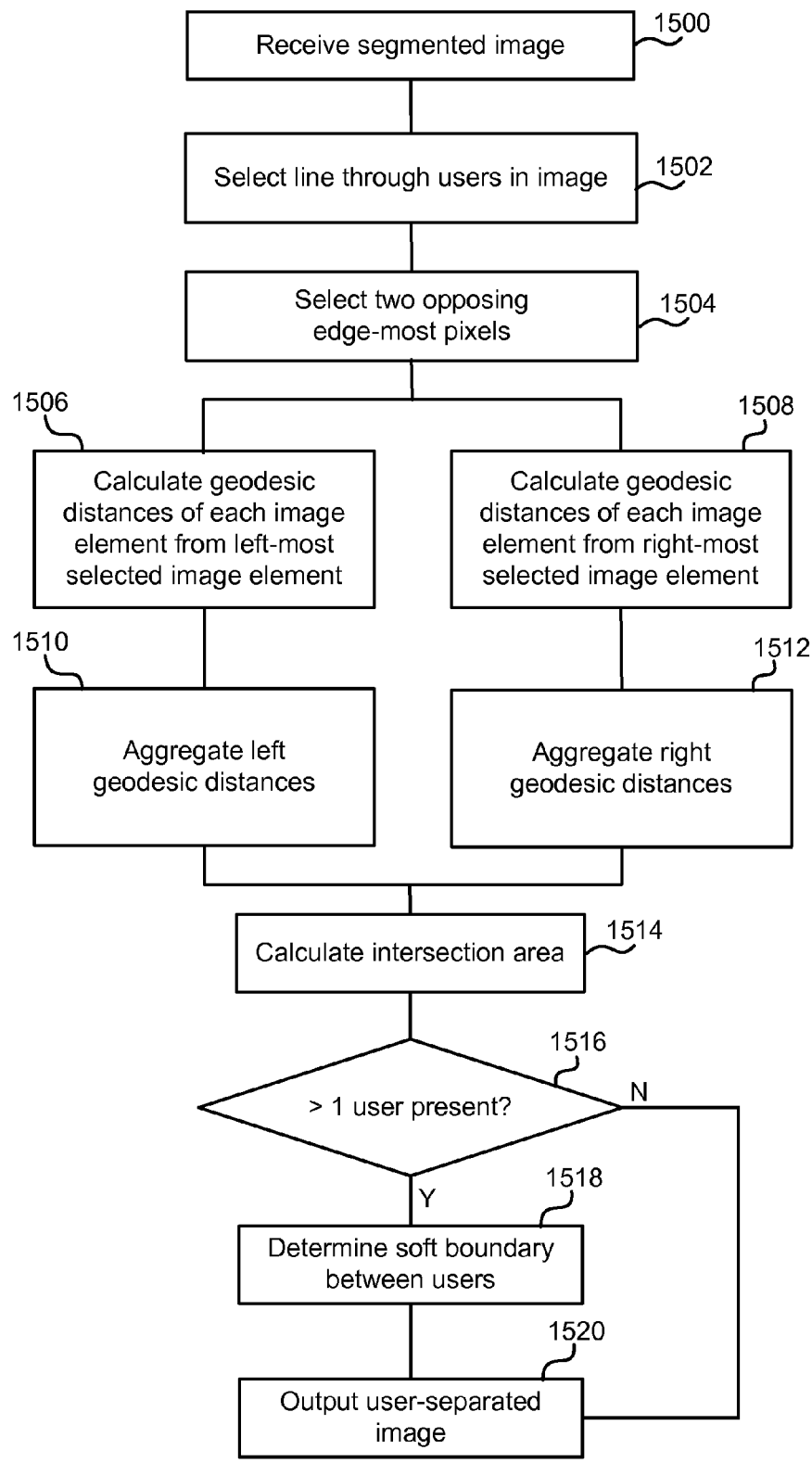
FIG. 15 illustrates a flowchart of a process for user separation.

The user separation process of FIG. 15 starts by receiving 1500 the segmented depth image. This segmented depth image can be segmented either by the geodesic segmentation process, or by the image classifier, or using the combination of the two shown in FIG. 14. For example, FIG. 16 shows a segmented depth image 1600 comprising a first user 1602 and a second user 1604.

A line through the users in the segmented image is then selected 1502. An example of such a line is shown by horizontal dashed line 1606 in FIG. 16. In some examples, the line can be horizontal and placed at a predetermined position in the image. Alternatively, the image can be analyzed to select an appropriate position and/or angle for the line (e.g. taking a horizontal line across the widest point of the image).

The two opposing edge-most image elements intersecting with the line are then selected 1504. For example, referring to FIG. 16, a first image element 1608 is selected at the left-most point where the depth image and line intersect, and a second image element 1610 is selected at the opposing right-most point where the depth image and line intersect.

The depth information in the segmented depth image 1600 is then used to calculate 1506 geodesic distances from each image element to the first image element 1608. In addition, geodesic distances are calculated 1508 from each image element to the second image element 1610.

The geodesic distances from each image element to the first image element 1608 are aggregated 1510 to form a left-hand side distance graph, and the geodesic distances from each image element to the second image element 1610 are aggregated 1512 to form a right-hand side distance graph. In one example, the aggregations can be performed by summing the geodesic distances from each image element over the y-axis at each point along the line 1606. This can be expressed as follows:

$$d_l(x) = \sum_{y=0}^{H} d(x, p_l), \text{ and}$$

$$d_r(x) = \sum_{y=0}^{H} d(x, p_r)$$

Where $d_l(x)$ is the left-hand side aggregated distance value for a point x on the x-axis of the image, $d_r(x)$ is the right-hand side aggregated distance value for a point x on the x-axis of the image, H is the height of the image (i.e. the maximum y-axis value), $d(x, p_l)$ is the geodesic distance between an image element x (having coordinates x, y) and the first image element 1608 (the left-most intersection), and $d(x, p_r)$ is the geodesic distance between image element x and the second image element 1610 (the right-most intersection). The values for $d_l(x)$ and $d_r(x)$ can optionally be normalized.

Figure 16:
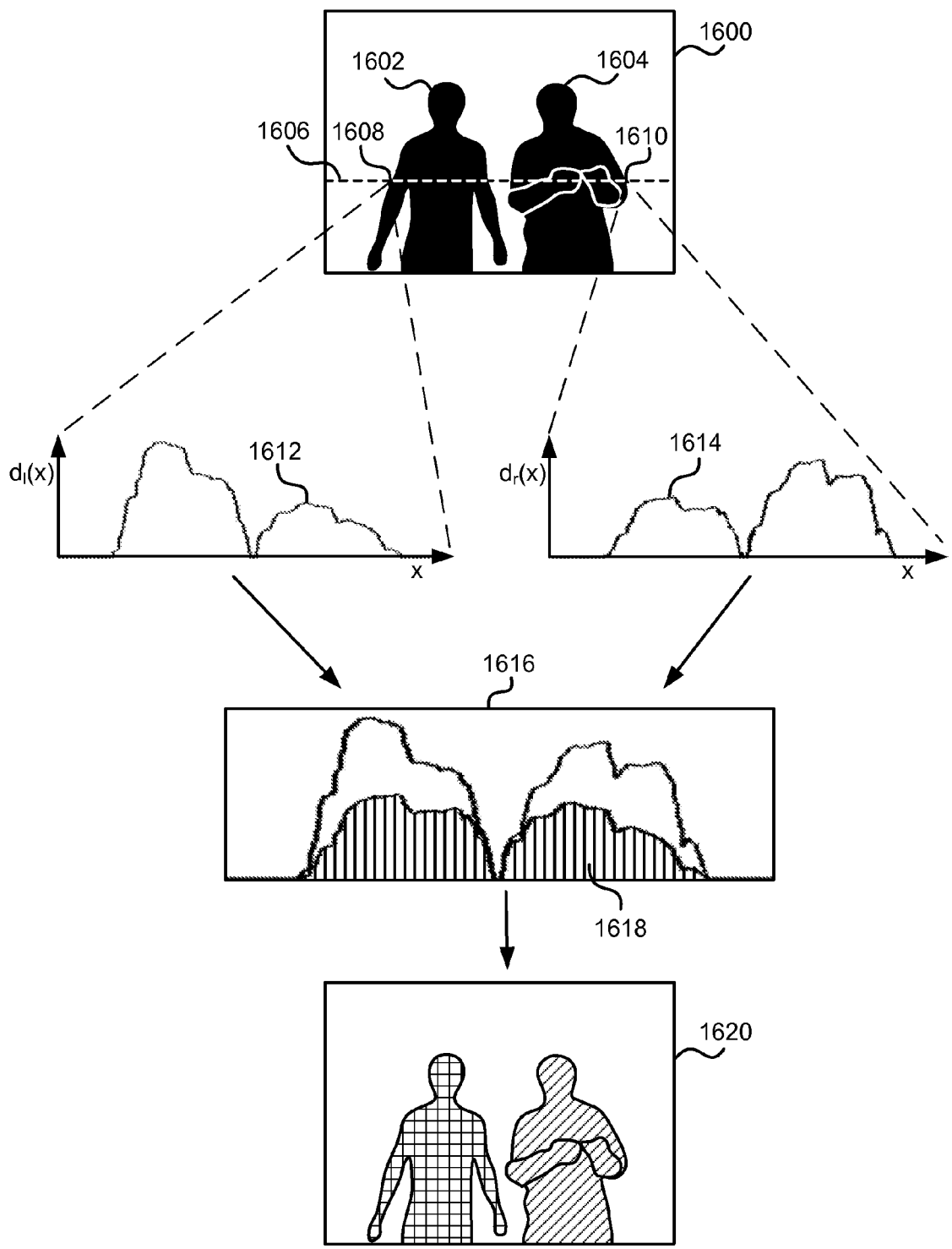
FIG. 16 illustrates an example scene showing the operation of the FIG. 15 flowchart.

An example of a left-hand side distance graph 1612 and right-hand side distance graph 1614 is shown in FIG. 16. The left-hand side distance graph 1612 and right-hand side distance graph 1614 are overlaid, as shown by graph 1616 in FIG. 16, and an intersection area 1618 (indicated by vertical hatching) is calculated 1514.

The value calculated for the intersection area 1618 is used to determine if there is more than one user present in the depth image. For example, if the value is 1 (or within a threshold of 1), then this means that either that there is only one user, or there is near complete overlap between more than one user. This is because a value close to or equal to 1 indicates that there is little difference between calculating the geodesic distances from either the left or right hand side, thereby indicating a single, uninterrupted body. Conversely, if the intersection area is less than 1 (or less than the threshold) then this indicates the presence of two, largely separated bodies. Note, however, that the users do not need to be completely disconnected in order to detect that there is more than one user.

If it is determined 1516 that there is only one user present, then further segmentation does not need to be performed, and the segmented image can be outputted 1520 without further processing. If, however, the intersection area value indicates that more than one user is present, then the location of a soft, probabilistic boundary is calculated 1518 between the users. The boundary can be calculated by determining the location on the x-axis of the cross-over point of the overlaid left-hand side distance graph 1612 and right-hand side distance graph 1614. Image elements to the one side of the cross-over point are labeled as belonging to the first user 1602, and image elements to the other side of the of the cross-over point are labeled as belonging to the second user 1604. Image elements in the region of the cross-over point can in some examples be labeled with a probabilistic value of belonging to one of the first or second user. The probabilistic value can be based upon the relative heights of the left- and right-hand side distance graphs.

Once the boundary between the users has been calculated, the final separated depth image can be outputted 1520, in which the users have been segmented from background objects and individually separated and labeled. An example of this is illustrated in FIG. 16, where a final segmented image 1620 shows the first user 1602 labeled with checked hatching, and the second user 1604 labeled with diagonal hatching. The two users depth images can then be separated and analyzed separately to independently monitor their movements and gestures, such that they can each provide input to the camera-based control system (e.g. each providing input to a multi-player game).

Figure 17:
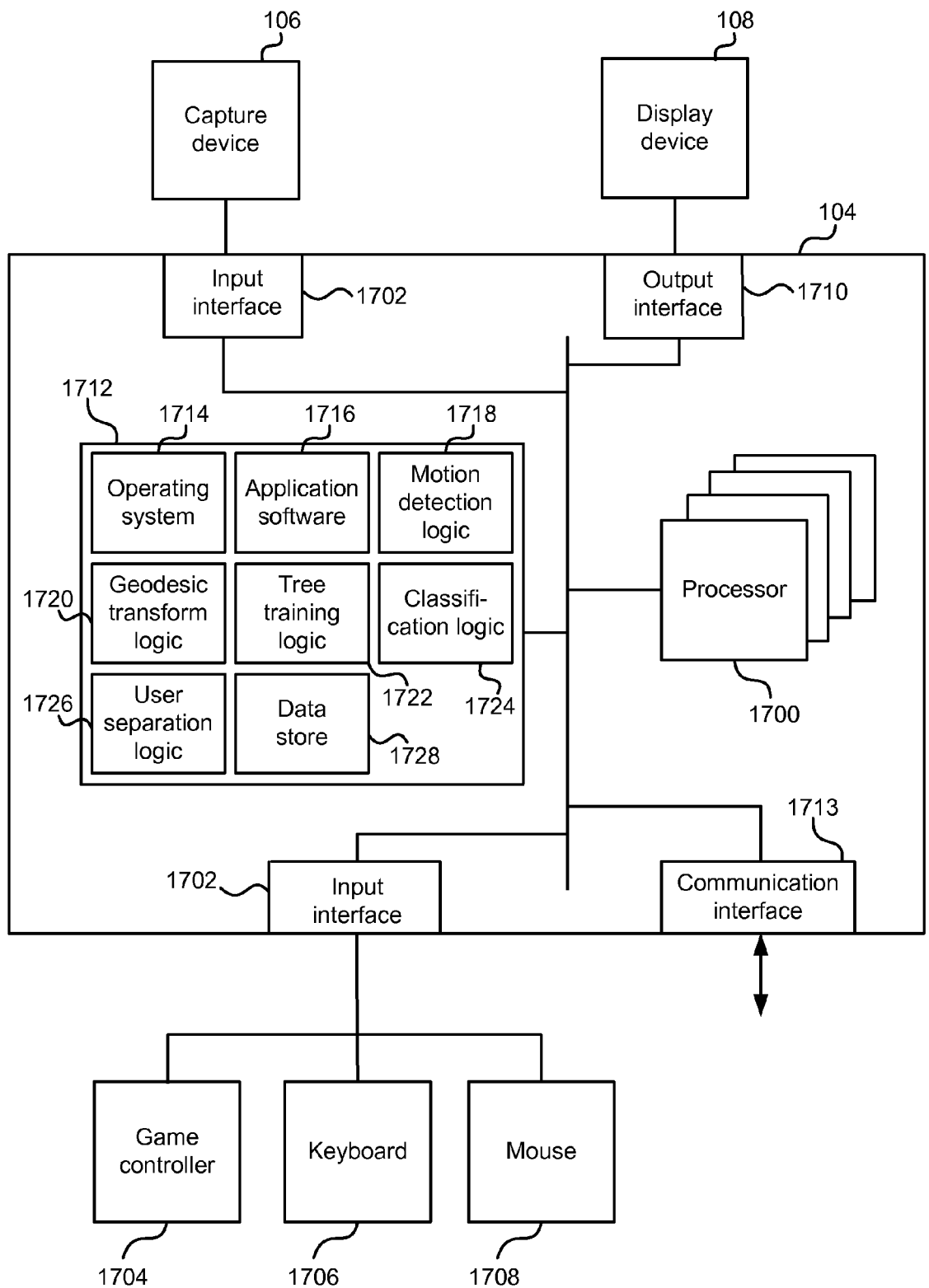
FIG. 17 illustrates an exemplary computing device in which embodiments of the image segmentation technique may be implemented.

Reference is now made to FIG. 17, which illustrates various components of an exemplary computing device 104 which may be implemented as any form of a computing and/or electronic device, and in which embodiments of the image segmentation techniques may be implemented.

The computing device 104 comprises one or more processors 1700 which may be microprocessors, controllers, graphics processing units or any other suitable type of processors for processing computing executable instructions to control the operation of the device in order to perform the above-described image segmentation techniques.

The computing device 104 also comprises one or more input interfaces 1702 arranged to receive and process input from one or more devices, such as user input devices (e.g. capture device 106, a game controller 1704, a keyboard 1706 and/or a mouse 1708). This user input may be used to control software applications or games executed on the computing device 104.

The computing device 104 also comprises an output interface 1710 arranged to output display information to a display device 108 which can be separate from or integral to the computing device 104. The display information may provide a graphical user interface. In an example, the display device 108 may also act as the user input device if it is a touch sensitive display device. The output interface may also output data to devices other than the display device, e.g. a locally connected printing device (not shown in FIG. 17).

Computer executable instructions may be provided using any computer-readable media that is accessible by computing device 104. Computer-readable media may include, for example, computer storage media such as memory 1712 and communications media. Computer storage media, such as memory 1712, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism. Although the computer storage media (memory 1712) is shown within the computing device 104 it will be appreciated that the storage may be distributed or located remotely and accessed via a network or other communication link (e.g. using communication interface 1713).

Platform software comprising an operating system 1714 or any other suitable platform software may be provided at the computing device 104 to enable application software 1716 to be executed on the device. Other software that can be executed on the computing device 104 includes: motion detection logic 1718 (see for example FIG. 5-6 and description above); geodesic transform logic (see for example FIGS. 5-7 and 8-10 and description above); decision tree training logic (see for example FIG. 11-12 and description above); image classification logic (see for example FIG. 13-14 and description above); and user separation logic (see for example FIG. 15-16 and description above). A data store 1728 is provided to store data such as previously received depth images; seed masks, intermediate function results; foreground masks, tree training parameters, probability distributions, classification labels, user masks, distance graphs and other results.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of segmenting a foreground portion from a background portion of an image having a plurality of image elements, each image element having an associated value, the method comprising:
    selecting a seed region in the foreground portion of the image;
    calculating, using a processor, a geodesic distance from each image element to the seed region using the associated values;
    generating a background seed using the geodesic distance from each image element to the seed region;
    calculating, using the processor, a geodesic distance from each image element to the background seed using the associated values;
    calculating an overall geodesic distance for each image element by combining: i) the geodesic distance from each image element to the seed region; and ii) the geodesic distance from each image element to the background seed;
    determining a subset of the image elements having an overall geodesic distance less than a predefined threshold; and
    labeling the subset of the image elements as foreground image elements.

2. The method according to claim 1, wherein selecting a seed region comprises: comparing the image to a previously stored image on a storage device to detect at least one changed region; and selecting the changed region to be the seed region.

3. The method according to claim 2, wherein the at least one changed region is caused by movement of at least one object in the image relative to the previously stored image.

4. The method according to claim 1, wherein combining comprises subtracting: i) the geodesic distance from each image element to the seed region, from: ii) the geodesic distance from each image element to the background seed.

5. The method according to claim 1, wherein generating the background seed comprises selecting a predefined shape for the background seed such that regions of shortest geodesic distance to the seed region are at least partially surrounded by the background seed.

6. The method according to claim 1, wherein the image is received from a depth camera, and the associated values represent a detected distance from the depth camera.

7. The method according to claim 1, wherein the image is received from an RGB camera, and the associated values represent a color value.

8. The method according to claim 1, further comprising subsequently analyzing each foreground image element using a machine learning classifier to classify each foreground image element as belonging to one of: a user, a foreground object; or background.

9. A computer-readable storage device, the computer-readable storage device being hardware and storing computer readable instruction that upon execution by a processor cause segmentation of a foreground portion from a background portion of an image having a plurality of image elements, each image element having an associated value, segmentation of the foreground portion from the background portion comprising:

selecting a seed region in the foreground portion of the image;

calculating, using a processor, a geodesic distance from each image element to the seed region using the associated values;

generating a distance image using a geodesic distance transform;

determining a subset of the image elements having a geodesic distance less than a predefined threshold; and labeling the subset of the image elements as foreground image elements.

10. The computer-readable storage device according to claim 9, wherein selecting a seed region comprises: comparing the image to a previously stored image on a storage device to detect at least one changed region; and selecting the changed region to be the seed region.

11. The computer-readable storage device according to claim 10, wherein the at least one changed region is caused by movement of at least one object in the image relative to the previously stored image.

12. The computer-readable storage device according to claim 9, wherein segmentation of the foreground portion from the background portion further comprises, prior to determining the subset:

generating a background seed using the geodesic distance from each image element to the seed region;

calculating, using the processor, a geodesic distance from each image element to the background seed using the associated values; and calculating an overall geodesic distance for each image element by combining: i) the geodesic distance from each image element to the seed region; and ii) the geodesic distance from each image element to the background seed.

13. The computer-readable storage device according to claim 12, wherein combining comprises subtracting: i) the geodesic distance from each image element to the seed region, from: ii) the geodesic distance from each image element to the background seed.

14. The computer-readable storage device according to claim 12, wherein generating the background seed comprises selecting a predefined shape for the background seed such that regions of shortest geodesic distance to the seed region are at least partially surrounded by the background seed.

15. The computer-readable storage device according to claim 9, wherein the image is received from a depth camera, and the associated values represent a detected distance from the depth camera.

16. The computer-readable storage device according to claim 9, wherein the image is received from an RGB camera, and the associated values represent a color value.

17. The computer-readable storage device according to claim 9, wherein segmentation of the foreground portion from the background portion further comprises subsequently analyzing each foreground image element using a machine learning classifier to classify each foreground image element as belonging to one of: a user, a foreground object; or background.

18. A device for automatically segmenting a foreground portion from a background portion of an image, wherein the image comprises a plurality of image elements, each having an associated value, and the image represents a user, at least one foreground object in proximity to the user, and a background, the device comprising:

an input interface arranged to receive the image from a capture device;

at least one processor;

a memory arranged to store a depth image derived from a plurality of previously received depth images and a decision forest comprising a plurality of distinct trained decision trees; and the memory further arranged to store executable instructions configured to cause the processor to:

select a seed region in the foreground portion of the image; calculate a geodesic distance from each image element to the seed region using the associated values;

determine a subset of the image elements having a geodesic distance within a predefined threshold distance of the seed region; select an image element from the subset; apply the subset image element to each of the trained decision trees to obtain a plurality of probabilities of the subset image element representing the user, the foreground object or the background; aggregate the probabilities from each of the trained decision trees and assign a classification of user, foreground object or background to the subset image element in dependence thereon; repeat the steps of selecting, applying and aggregating for each image element in the subset; and output the subset image elements having the classification of user as the foreground portion.

19. A device according to claim 18, wherein the device is one of: a video game system or a depth camera.

20. The method according to claim 1 further comprising generating a distance image using a geodesic distance transform.

* * * * *